(12) United States Patent
Park

(10) Patent No.: US 12,505,839 B2
(45) Date of Patent: Dec. 23, 2025

(54) ELECTRONIC APPARATUS AND CONTROL METHOD THEREOF

(71) Applicant: SAMSUNG ELECTRONICS CO., LTD., Suwon-si (KR)

(72) Inventor: Junhyeon Park, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 298 days.

(21) Appl. No.: 18/297,948

(22) Filed: Apr. 10, 2023

(65) Prior Publication Data

US 2023/0245656 A1    Aug. 3, 2023

Related U.S. Application Data

(63) Continuation of application No. PCT/KR2022/021373, filed on Dec. 27, 2022.

(30) Foreign Application Priority Data

Dec. 30, 2021   (KR) .......................... 10-2021-0192699

(51) Int. Cl.
*G10L 15/00* (2013.01)
*G10L 15/22* (2006.01)
*G10L 15/26* (2006.01)

(52) U.S. Cl.
CPC .............. *G10L 15/22* (2013.01); *G10L 15/26* (2013.01); *G10L 2015/223* (2013.01)

(58) Field of Classification Search
CPC .................................. G10L 15/22; G06F 3/167
See application file for complete search history.

(56) References Cited

U.S. PATENT DOCUMENTS 9,858,925 B2    1/2018  Gruber et al.
10,311,877 B2 *  6/2019  Lee .......................... G06F 3/167
10,475,446 B2   11/2019  Gruber et al.
(Continued)

FOREIGN PATENT DOCUMENTS

JP          6686154 B2   4/2020
JP       2020067584 A    4/2020
(Continued)

OTHER PUBLICATIONS

International Search Report dated Apr. 11, 2023 for PCT Application No. PCT/KR2022/021373.
(Continued)

*Primary Examiner* — Daniel Abebe
(74) *Attorney, Agent, or Firm* — Nixon & Vanderhye P.C.

(57) ABSTRACT

An electronic apparatus may be configured for receiving a user voice input; obtaining a text corresponding to the user voicer input and accuracy of the text; identifying at least one instruction corresponding to the obtained text among pre-stored plurality of instructions; identifying an operation corresponding to the user voice input among a plurality of preset operations based on filter information corresponding to a preset word included in the obtained text and the accuracy; and performing at least one of executing a function corresponding to an instruction according to the user voice input and providing a response corresponding to the user voice input based on the at least one instruction and the identified operation.

20 Claims, 15 Drawing Sheets

(56) References Cited

U.S. PATENT DOCUMENTS

| | | |
|---|---|---|
| 10,741,170 B2 | 8/2020 | Li et al. |
| 10,825,456 B2 | 11/2020 | Won |
| 10,891,958 B2 | 1/2021 | Gao et al. |
| 10,964,327 B2 | 3/2021 | Lee et al. |
| 11,302,331 B2 | 4/2022 | Gowda et al. |
| 11,335,325 B2 | 5/2022 | Sung et al. |
| 11,455,990 B2 | 9/2022 | Kwon |
| 11,487,953 B2 | 11/2022 | Kim et al. |
| 2010/0121638 A1 | 5/2010 | Pinson et al. |
| 2012/0265528 A1 | 10/2012 | Gruber et al. |
| 2012/0265536 A1* | 10/2012 | Paik .................. G10L 15/22 704/E11.001 |
| 2014/0297284 A1 | 10/2014 | Gruber et al. |
| 2016/0148610 A1* | 5/2016 | Kennewick, Jr. ....... G10L 15/18 704/240 |
| 2018/0233147 A1* | 8/2018 | Tukka ................. G10L 15/1815 |
| 2020/0234693 A1 | 7/2020 | Sung et al. |
| 2021/0150155 A1 | 5/2021 | Kim et al. |
| 2022/0084505 A1* | 3/2022 | Baharav ................. G06F 3/167 |
| 2024/0021199 A1* | 1/2024 | Ishimaru ................. G10L 15/22 |

FOREIGN PATENT DOCUMENTS

| | | | |
|---|---|---|---|
| KR | 101683083 B1 | | 12/2016 |
| KR | 20190034964 A | * | 4/2017 |
| KR | 10-2019-0060157 A | | 6/2019 |
| KR | 10-2009423 B1 | | 8/2019 |
| KR | 10-2020-0036419 A | | 4/2020 |
| KR | 20200091328 A | | 7/2020 |
| KR | 10-2020-0127814 A | | 11/2020 |
| KR | 10-2020-0132645 A | | 11/2020 |
| KR | 20210061141 A | | 5/2021 |
| KR | 10-2276537 B1 | | 7/2021 |
| KR | 102474804 B1 | * | 12/2022 |

OTHER PUBLICATIONS

PCT Written Opinion dated Apr. 11, 2023 for PCT Application No. PCT/KR2022/021373.

* cited by examiner

ELECTRONIC APPARATUS AND CONTROL METHOD THEREOF

CROSS-REFERENCE TO RELATED APPLICATIONS

This application is a bypass continuation of International Application No. PCT/KR2022/021373, filed on Dec. 27, 2022, which is based on and claims priority to Korean Patent Application No. 10-2021-0192699, filed on Dec. 30, 2021, in the Korean Intellectual Property Office, the disclosures of which are incorporated by reference herein in their entireties.

BACKGROUND

Field

Certain example embodiments relate to an electronic apparatus and/or a control method thereof and, for example, to an electronic apparatus providing a response to a user voice input and/or a control method thereof.

Description of Related Art

Artificial intelligence (AI) systems have been used in various fields recently. In particular, an AI system is widely used in the field of utilizing audio data including user voice input.

When a user voice input is received, the electronic apparatus may obtain text for the user voice input and execute a function corresponding to the user voice input based on the text.

In the related art, a natural language processing technology and a technology of utilizing audio data are developed, so that a method of complementing audio data in the natural language and speech recognition stages emerges. Accordingly, in the related art, a method of improving a recognition rate using a user context as well as audio data and providing a response has been proposed, but additional devices are required to collect the user context, and users may feel burden so the related art is not substantially used.

Accordingly, there is a necessity of a method of providing a response suitable to a user only with user voice input.

SUMMARY

Accordingly, an aspect is to provide an electronic apparatus providing various responses and/or a control method thereof.

A control method of an electronic apparatus according to an example embodiment may include receiving a user voice input; obtaining a text corresponding to the user voicer input and accuracy of the text; identifying at least one instruction corresponding to the obtained text among prestored plurality of instructions; identifying an operation corresponding to the user voice input among a plurality of preset operations based on filter information corresponding to a preset word included in the obtained text and the accuracy; and performing at least one of executing a function corresponding to an instruction according to the user voice input and providing a response corresponding to the user voice input based on the at least one instruction and the identified operation.

The identifying the operation may include, based on a predetermined first type word being identified among the words included in the obtained text, increasing a first value corresponding to the filter information according to the word of the first type, and based on a preset second type word being identified among the words included in the obtained text, decreasing a first value corresponding to the filter information according to the second type of word; based on the value of accuracy being higher, decreasing a second value corresponding to the accuracy, and based on the value of accuracy being lower, increasing a second value corresponding to the accuracy; and identifying an operation corresponding to the user voice input among a plurality of preset operations based on a value in which the first value and the second value are summed.

The performing may include, based on identifying that a function corresponding to an instruction is executed based on similarity between the text and the at least one instruction, performing a function corresponding to an instruction having the highest similarity with the text among the at least one instruction; and based on a function corresponding to the instruction having the highest similarity with the text being executed, performing provision of a response corresponding to the user voice input based on the instruction corresponding to the executed function and the identified operation.

The method may include, based on identifying that a function corresponding to the instruction is not executed, performing provision of a response corresponding to the user voice input based on the identified operation.

The identifying the operation may include, based on identifying that the summed value is present within a first range, identifying an operation corresponding to the user voice input as a first operation, and the performing may include, based on identifying that the operation corresponding to the user voice input is a first operation, providing a different response depending on whether to execute a function corresponding to the instruction according to the user voice input.

The providing the response may further include, based on a function corresponding to the instruction according to the user voice input being executed, providing a list corresponding to a remaining instruction except for an instruction corresponding to the executed function among the at least one instruction; and based on a function corresponding to the instruction according to the user voice input being not executed, providing a list corresponding to the at least one instruction.

The identifying the operation may include, based on identifying that the summed value is within the second range, identifying an operation corresponding to the user voice input as a second operation, the performing may include, based on identifying that an operation corresponding to the user voice input is a second operation, providing a different response depending on whether to execute a function corresponding to the instruction according to the user voice input.

The method may include, based on a function corresponding to the instruction according to the user voice input being executed, providing an associated instruction list providable after the executed function is executed; and based on a function corresponding to the instruction according to the user voice input being not executed, providing a list corresponding to the at least one instruction.

The identifying the operation may include, based on identifying that the summed value is within a third range, identifying the operation corresponding to the user voice input as a third operation, the performing may include, based on identifying that an operation corresponding to the user voice input is a third operation and a function corresponding to the instruction according to the user voice input is executed, providing a text and a voice response corresponding to the executed function; and based on identifying that an operation corresponding to the user voice input is a third operation and a function corresponding to the instruction according to the user voice input is not executed, providing a text and a voice response indicating that the function is not executed.

The identifying the operation may include, based on identifying that the summed value is within a fourth range, identifying an operation corresponding to the user voice as a fourth operation, and the performing may include, based on identifying that the operation corresponding to the user voice input is a fourth operation and a function corresponding to an instruction according to the user voice input is executed, providing a text corresponding to the executed function; and based on identifying that the operation corresponding to the user voice input is a fourth operation and a function corresponding to an instruction according to the user voice input is not executed, providing a text indicating that the function is not executed.

The identifying the operation may include, based on identifying that the summed value is within a fifth range, identifying an operation corresponding to the user voice input as a fifth operation, and based on identifying that the operation corresponding to the user voice input is a fifth operation, not providing a response corresponding to the user voice input.

The first type of word may include a word corresponding to curse, and the second type of word may be characterized in that it includes a word corresponding to a compliment.

An electronic apparatus according to an example embodiment may include a memory comprising at least one instruction, and at least one processor connected, directly or indirectly, to the memory and configured to control the electronic apparatus, and the at least one processor, by executing the at least one instruction, may be configured to receive a user voice input, obtain a text corresponding to the user voicer input and accuracy of the text, identify at least one instruction corresponding to the obtained text among prestored plurality of instructions, identify an operation corresponding to the user voice input among a plurality of preset operations based on filter information corresponding to a preset word included in the obtained text and the accuracy, and perform at least one of executing a function corresponding to an instruction according to the user voice input and providing a response corresponding to the user voice input based on the at least one instruction and the identified operation.

The at least one processor may, based on a predetermined first type word being identified among the words included in the obtained text, be configured to increase a first value corresponding to the filter information according to the word of the first type, and based on a preset second type word being identified among the words included in the obtained text, decrease a first value corresponding to the filter information according to the second type of word, based on the value of accuracy being higher, decrease a second value corresponding to the accuracy, and based on the value of accuracy being lower, increase a second value corresponding to the accuracy, and identify an operation corresponding to the user voice input among a plurality of preset operations based on a value in which the first value and the second value are summed.

The at least one processor may, based on identifying that a function corresponding to an instruction is executed based on similarity between the text and the at least one instruction, be configured to perform a function corresponding to an instruction having the highest similarity with the text among the at least one instruction, and based on a function corresponding to the instruction having the highest similarity with the text being executed, perform provision of a response corresponding to the user voice input based on the instruction corresponding to the executed function and the identified operation.

The at least one processor may, based on identifying that a function corresponding to the instruction is not executed, be configured to perform provision of a response corresponding to the user voice input based on the identified operation.

The at least one processor may, based on identifying that the summed value is within the second range, be configured to identify an operation corresponding to the user voice input as a second operation, and, based on identifying that an operation corresponding to the user voice input is a second operation, provide a different response depending on whether to execute a function corresponding to the instruction according to the user voice input.

The at least one processor may, based on a function corresponding to the instruction according to the user voice input being executed, be configured to provide a list corresponding to remaining instructions other than an instruction corresponding to the executed function among the at least one instruction, and based on a function corresponding to the instruction according to the user voice input being not executed, provide a list corresponding to the at least one instruction.

The at least one processor, if the summed value is identified as being present within the second range, may be configured to identify the operation corresponding to the user voice input as the second operation, and if the operation corresponding to the user voice input is identified as a second operation, may provide a different response depending on whether to execute a function corresponding to the instruction according to the user voice input.

The at least one processor may be configured to provide a list of related instructions that may be provided after the function corresponding to the command according to the user voice input is executed, when the function corresponding to the user voice input is executed, and if the function corresponding to the instruction according to the user voice input is not executed, the processor may provide a list corresponding to the at least one command.

The at least one processor may, based on identifying that the summed value is within a third range, be configured to identify the operation corresponding to the user voice input as a third operation, based on identifying that an operation corresponding to the user voice input is a third operation and a function corresponding to the instruction according to the user voice input is executed, provide a text and a voice response corresponding to the executed function, and based on identifying that an operation corresponding to the user voice input is a third operation and a function corresponding to the instruction according to the user voice input is not executed, provide a text and a voice response indicating that the function is not executed.

The at least one processor may, based on identifying that the summed value is within a fourth range, be configured to identify an operation corresponding to the user voice as a fourth operation, and based on identifying that the operation corresponding to the user voice input is a fourth operation and a function corresponding to an instruction according to the user voice input is executed, provide a text corresponding to the executed function; and based on identifying that the operation corresponding to the user voice input is a fourth operation and a function corresponding to an instruction according to the user voice input is not executed, provide a text indicating that the function is not executed.

The at least one processor may, if the summed value is identified as being present within the fifth range, be configured to identify the operation corresponding to the user voice input as the fifth operation, and if the operation corresponding to the user voice input is identified as the fifth operation, the processor may not provide a response corresponding to the user voice input.

The first type of word includes a word corresponding to curse, and the second type of word may be characterized in that it includes a word corresponding to a compliment.

An electronic apparatus may provide various responses through a user voice input only.

BRIEF DESCRIPTION OF DRAWINGS

The above and other aspects, features, and advantages of certain example embodiments of the present disclosure will be more apparent from the following detailed description, taken in conjunction with the accompanying drawings, in which.

DETAILED DESCRIPTION

Hereinafter, an example embodiment will be described in detail with reference to the drawings.

Figure 1:
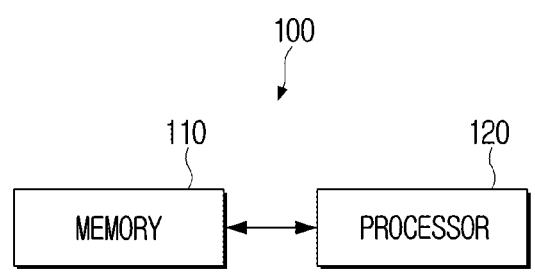
FIG. 1 is a block diagram illustrating a configuration of an example electronic apparatus.

FIG. 1 is a block diagram illustrating a configuration of an electronic apparatus.

As shown in FIG. 1, an electronic apparatus 100 may include a memory 110 and a processor 120. The electronic apparatus 100 may be implemented as a user terminal device or a home appliance, but this is merely an embodiment and may be implemented as at least one server.

The memory 110 may store various programs and data necessary for operation of the electronic apparatus 100. At least one instruction may be stored in the memory 110. The processor 120 (comprising processing circuitry) may perform an operation of the electronic apparatus 100 by executing instructions stored in the memory 110.

The memory 110 may be implemented as a non-volatile memory, a volatile memory, a flash-memory, a hard disk drive (HDD), a solid state drive (SSD), or the like. The memory 110 may be accessed by the processor 120, and read/write/modify/update, etc. of data by the processor 120 may be performed. The term memory may include a memory 110, a read-only memory (ROM) (not shown) in the processor 120, a random access memory (RAM) (not shown), or a memory card (not shown) (e.g., a micro secure digital (SD) card, a memory stick) mounted on the electronic apparatus 100. In the memory 110, programs and data, or the like, to configure various screens to be displayed on a display region of a display may be stored.

The memory 110 may store an AI agent (e.g., trained AI agent) to perform speech recognition system. The electronic apparatus 100 may use an AI agent to generate natural language in response to the user utterance. At this time, the AI agent is a dedicated program to provide AI-based services (for example, speech recognition services, secretarial services, translation services, search services, etc.) and may be executed by existing general-purpose processors (for example, CPUs) or separate AI-only processors (for example, GPUs).

The processor 120 is electrically connected, directly or indirectly, to the memory 110 to control overall operations and functions of the electronic apparatus 100. The processor 120 may be configured with one or a plurality of processors. At this time, one or a plurality of processors may be a general purpose processor, such as a central processing unit (CPU), an application processor (AP), or the like, a graphics-only processor such as graphics processing unit (GPU), visual processing unit (VPU), or the like, or an AI-dedicated processor such as neural network processing unit (NPU).

The one or more processors control the processing of the input data according to a predefined operating rule or AI model stored in the memory 110, that can be trained. The predefined operating rule or AI model is made through learning. Here, that the AI model is made through learning may refer that the learning algorithm is applied to a plurality of learning data, so that a predefined operating rule or AI model of a desired characteristic is generated. The learning of the AI model may be performed in a device itself in which AI is performed, and may be implemented through a separate server/system.

The AI model may include a plurality of neural network layers. Each layer has a plurality of weight values, and performs a layer operation through a result of calculation of a previous layer and an operation of a plurality of weights. Examples of neural networks include, but are not limited to, a convolutional neural network (CNN), a deep neural network (DNN), a recurrent neural network (RNN), a Restricted Boltzmann Machine (RBM), a Deep Belief Network (DBN), a Bidirectional Recurrent Deep Neural Network (BRDNN), and a Deep Q-Networks, and the neural network is not limited to the above-described example.

The processor 120 may control hardware or software components coupled to the processor 120 by driving an operating system or an application program, and may perform various data processing and operations. Further, the processor 120 may load and process instructions or data received from at least one of the other components into the volatile memory and store the various data in the non-volatile memory.

The processor 120 may be electrically connected, directly or indirectly, to the memory 110 to control the overall operation and function of the electronic apparatus 100. The processor 120 may receive user voice input. For example, the processor 120 may receive user voice input via a microphone included in the electronic apparatus 100. For example, the processor 120 may receive a user voice input through a microphone (e.g., a microphone of a remote controller) outside the electronic apparatus 100. For example, the processor 120 may receive user voice input via a user terminal device (e.g., a smartphone) capable of communicating with the electronic apparatus 100.

The processor 120 may obtain accuracy for text and text corresponding to the user voice input. Specifically, the processor 120 may input a user voice input into an ASR model to obtain accuracy information for text and text corresponding to the user voice input. The ASR model may be a model for converting a voice signal into text, and may receive a voice signal and output a text corresponding to a voice signal. As an example, the ASR model may be implemented as an artificial intelligence model. For example, before inputting the user voice input to the ASR model, the processor 120 may perform pre-processing on the user voice input to convert the user voice input into an appropriate voice signal, and then input the converted voice signal into the ASR model. In addition, the ASR model may output accuracy information on the outputted text, along with the text. The accuracy information is information on the accuracy of the user voice input inputted to the ASR model and the text output from the ASR model, and the higher accuracy, the higher the accuracy of the user voice input to the ASR model.

The processor 120 may obtain at least one instruction corresponding to the obtained text of the plurality of instructions pre-stored in the memory 110. For example, a plurality of instructions for providing a function corresponding to a user voice input may be stored in the memory 110. The processor 120 may compare text corresponding to a user voice input obtained through a plurality of instructions stored in the memory 110 and a text corresponding to a user voice input obtained through an ASR model to identify at least one instruction corresponding to a text corresponding to a user voice input of the plurality of instructions. As an example, the processor 120 may obtain a similarity between a plurality of instructions pre-stored in the memory 110 and text corresponding to a user voice input obtained through an ASR model, and identify at least one of a plurality of instructions on the basis of the obtained similarity. Specifically, the processor 120 may obtain the similarity between the plurality of instructions stored in the memory 110 and the text corresponding to the user voice input obtained through the ASR model using an algorithm capable of digitizing the similarity, such as a Euclidean similarity measurement method or a similarity measurement method through machine learning.

In an embodiment, the processor 120 may identify at least one instruction of which a similarity with the text corresponding to the user voice input obtained through the ASR model, among the plurality of instructions, exceeds a threshold value (e.g., 0.7). If one instruction of which a similarity with the text corresponding to the user voice input obtained through the ASR model among the plurality of instructions exceeds a threshold value (e.g., 0.7) is not identified, the processor 120 may identify an instruction of a predetermined number (e.g., three) having a high degree of similarity with the text corresponding to the user voice input obtained through the ASR model of the plurality of instructions.

The processor 120 may identify an operation corresponding to a user voice input among a plurality of preset operations based on filter information corresponding to a predetermined word included in the obtained text and accuracy of the text. The preset operation may include a plurality of operation types for providing various responses corresponding to the user's voice input. As an example, the preset operation may include a first operation that provides the most aggressive response, a second operation that provides an aggressive response, a third operation that provides a basic response, a fourth operation that provides a simplified response, and a fifth operation that provides a minimized response.

The filter information may be information on whether a preset word is included in the text obtained through the ASR model. Specifically, when a predetermined first type of word is identified among the words included in the obtained text, the processor 120 may set a first value corresponding to the filter information according to a word of the first type. If a predetermined second type of word is identified among the words included in the obtained text, the processor 120 may set the first value corresponding to the filter information to be lowered according to the second type of word. As an example, the first type of word may include a word corresponding to compliment or a positive word, and the second type of word may include a word corresponding to a curse word or a negative word. For example, the processor 120 may control to provide a response in a direction that provides an aggressive response by increasing a first value (e.g. +0.1) corresponding to the filter information if a first type of word corresponding to the compliment is included in the text obtained in the ASR model is identified. If the second type of word corresponding to the curse word is identified in the text obtained in the ASR model, the processor 120 may control to provide a response in a direction that provides a minimized response by lowering the first value corresponding to the filter information (e.g., −0.1).

However, the disclosure is not limited thereto, and the first type of word may include a word type to provide a response type in an aggressive response, and the second type of word may include a word type to provide a response type as a minimized response. As an example, if the user is cooking in a kitchen, the user may be inconvenient to control the electronic apparatus 100, and thus may set the word corresponding to the kitchen or cooking to the word of the first type. The processor 120 may control to provide a response in a direction that provides an aggressive response when a word corresponding to the kitchen or cooking is identified. For example, if a user is located in a living room or a bedroom, the user may easily control the electronic apparatus 100 so a word corresponding to the living room or the bedroom may be set as a second type of word. If a word corresponding to the living room or the bedroom is identified, the processor 120 may control to provide a response in a direction that provides a minimized response. Such a first type of word and a second type of word may be pre-set by the manufacturer of the electronic apparatus 100, or set by the user.

The processor 120 may set the second value corresponding to the accuracy to be lowered (e.g., 0), as the accuracy value (e.g., 1) of the text obtained by the ASR model is higher, and may set the second value corresponding to the accuracy to increase (e.g., 1) as the accuracy value is lower (e.g., 0). The processor 120 may control to provide a response in a direction that provides an aggressive response as the accuracy of the text obtained in the ASR model is lower, and may provide a response in a direction that provides a minimized or small/short response as the accuracy value is higher.

The processor 120 may identify an operation corresponding to a user voice input among the plurality of preset operations based on a value obtained by summing the first value and the second value. For example, the range of summed values may range from 0 to 1, and may be lower than 0 or higher than 1 depending on the first value and the second value. For example, if the summed value is identified as being within the first range (greater than 0.8), the processor 120 may identify an operation corresponding to the user voice input as a first operation. If the summed value is identified as being present in the second range (greater than 0.6 and less than or equal to 0.8), the processor 120 may identify an operation corresponding to the user voice input as a second operation. If the summed value is identified as being present in the third range (greater than 0.4 and less than or equal to 0.6), the processor 120 may identify an operation corresponding to the user voice input as a third operation. If the summed value is identified as being present within the fourth range (greater than 0.2 and less than or equal to 0.4), the processor 120 may identify an operation corresponding to the user voice input as a fourth operation. If the summed value is identified as being present in the fifth range (0.2 or less), the processor 120 may identify an operation corresponding to the user voice input as a fifth operation.

The processor 120 may perform at least one of a function execution corresponding to the instruction according to the user voice input and response provision corresponding to the user voice input based on the identified at least one instruction and the identified operation. The response provision corresponding to the user voice input may be provided based on the identified operation during the first to fifth operations. The function execution corresponding to the instruction according to the user voice input may be provided based on whether to execute a function corresponding to the instruction.

In an embodiment, if at least one instruction that has a similarity over a threshold value (e.g., 0.7) with text corresponding to a user voice input obtained through the ASR model among a plurality of instructions is identified, the processor 120 may identify that the processor 120 executes a function corresponding to the instruction. In addition, the processor 120 may execute a function corresponding to one of the at least one identified instruction.

For example, the processor 120 may execute a function corresponding to the instruction having the highest similarity to the text among the identified at least one instruction. On the other hand, if there are more than two instructions having the highest similarity among the at least one instruction, the processor 120 may execute a function corresponding to a number of instructions having large number of interactions required to perform a function corresponding to an instruction among the instructions having the highest similarity. For example, the first instruction may include a first interaction executing the first application to perform a function corresponding to the corresponding instruction and a second interaction searching a search word corresponding to the first instruction in the first application. The second instruction may include a third interaction identifying an application corresponding to the second instruction, a fourth interaction executing the identified application, and a fifth interaction searching a search word corresponding to the second instruction in the execution application. In this case, if the first instruction and the second instruction are identified as an instruction having the highest similarity with the text obtained in the ASR model, the processor 120 may execute a function corresponding to the second instruction.

As another embodiment, if it is not identified an instruction of which a similarity with the text corresponding to the user voice input obtained by the ASR model, among the plurality of instructions, is higher than a threshold value (e.g., 0.7), the processor 120 may identify an instruction of a predetermined number (e.g., three) having a high degree of similarity with the text corresponding to the user voice input obtained through the ASR model of the plurality of instructions, and may identify that the function corresponding to the instruction is not executed.

If there is an instruction that has a similarity over a threshold value with the text corresponding to the user voice input obtained through the ASR model is present among the plurality of instructions, the processor 120 may identify that a function corresponding to the instruction is executed, and if there is no instruction above the threshold value, the processor 120 may identify that the processor 120 does not execute the function corresponding to the instruction. When it is identified that a function corresponding to the instruction is executed, the processor 120 may perform a function corresponding to one of the identified at least one instruction, and perform response provision corresponding to the user voice input based on the identified operation. If it is identified that the function corresponding to the instruction is not executed, the processor 120 may perform response provision corresponding to the user voice input based on the identified operation without executing the function corresponding to the instruction.

In an embodiment, if the value obtained by summing the first value and the second value is identified as being present in the first range (greater than 0.8), the processor 120 may identify an operation corresponding to the user voice input as a first operation. The processor 120 may provide a different response depending on whether to execute the function corresponding to the instruction according to the user voice input. When an operation corresponding to a user voice input is identified as a first operation and a function corresponding to an instruction according to a user voice input is executed, the processor 120 may provide a list corresponding to the remaining instructions except for an instruction corresponding to the executed function among at least one instruction corresponding to the text obtained through the ASR model among the plurality of instructions stored in the memory 110. If the operation corresponding to the user voice input is identified as the first operation and the function corresponding to the instruction according to the user voice input is not executed, the processor 120 may provide a list corresponding to the identified at least one instruction. An embodiment of providing a response according to the first operation will be described later with reference to FIGS. 3A and 3B.

In an embodiment, if the value obtained by summing the first value and the second value is identified as being present in the second range (greater than 0.6 and less than or equal to 0.8), the processor 120 may identify an operation corresponding to the user voice input as a second operation. The processor 120 may provide a different response depending on whether to execute the function corresponding to the instruction according to the user voice input. When an operation corresponding to a user voice input is identified as a second operation and a function corresponding to an instruction according to a user voice input is executed, the processor 120 may provide an associated instruction list that may be provided after the executed function is executed. If the operation corresponding to the user's voice input is identified as the second operation and the function corresponding to the instruction according to the user's voice input is not executed, the processor 120 may provide a list corresponding to at least one instruction corresponding to the text obtained through the ASR model among a plurality of instructions prestored in the memory 110. An embodiment of providing a response according to the second operation will be described later with reference to FIGS. 4A and 4B.

In an embodiment, when it is identified that the sum of the first value and the second value is within the third range (more than 0.4 and less than or equal to 0.6), the processor 120 may identify an operation corresponding to the user voicer input as a third operation. When the operation corresponding to the user's voice input is identified as the third operation and the function corresponding to the instruction according to the user's voice input is executed, the processor 120 may provide text and voice responses corresponding to the executed function. If the operation corresponding to the user voice input is identified as the third operation and the function corresponding to the instruction according to the user voice input is not executed, the processor 120 may provide a text and a voice response indicating that the corresponding function is not executed. An embodiment of providing a response according to the second operation will be described later with reference to FIGS. 5A and 5B.

In an embodiment, if the value obtained by summing the first value and the second value is identified as being present in the fourth range (greater than 0.2 and less than or equal to 0.4), the processor 120 may identify an operation corresponding to the user voice input as a fourth operation. When the operation corresponding to the user voice input is identified as the fourth operation and the function corresponding to the instruction according to the user voice input is executed, the processor 120 may provide the text corresponding to the executed function. If the operation corresponding to the user voice input is identified as the fourth operation and the function corresponding to the instruction according to the user voice input is not executed, the processor 120 may provide the text indicating that the corresponding function is not executed. An embodiment of providing a response according to the second operation will be described later with reference to FIGS. 6A and 6B.

For example, if the value obtained by summing the first value and the second value is identified as being present in the fifth range (0.2 or less), the processor 120 may identify an operation corresponding to the user voice input as a fifth operation. If the operation corresponding to the user voice input is identified as a fifth operation, the processor 120 may not provide a response corresponding to the user voice input. An embodiment that does not provide a response according to the fifth operation will be described later with reference to FIGS. 7A and 7B.

Figure 2:
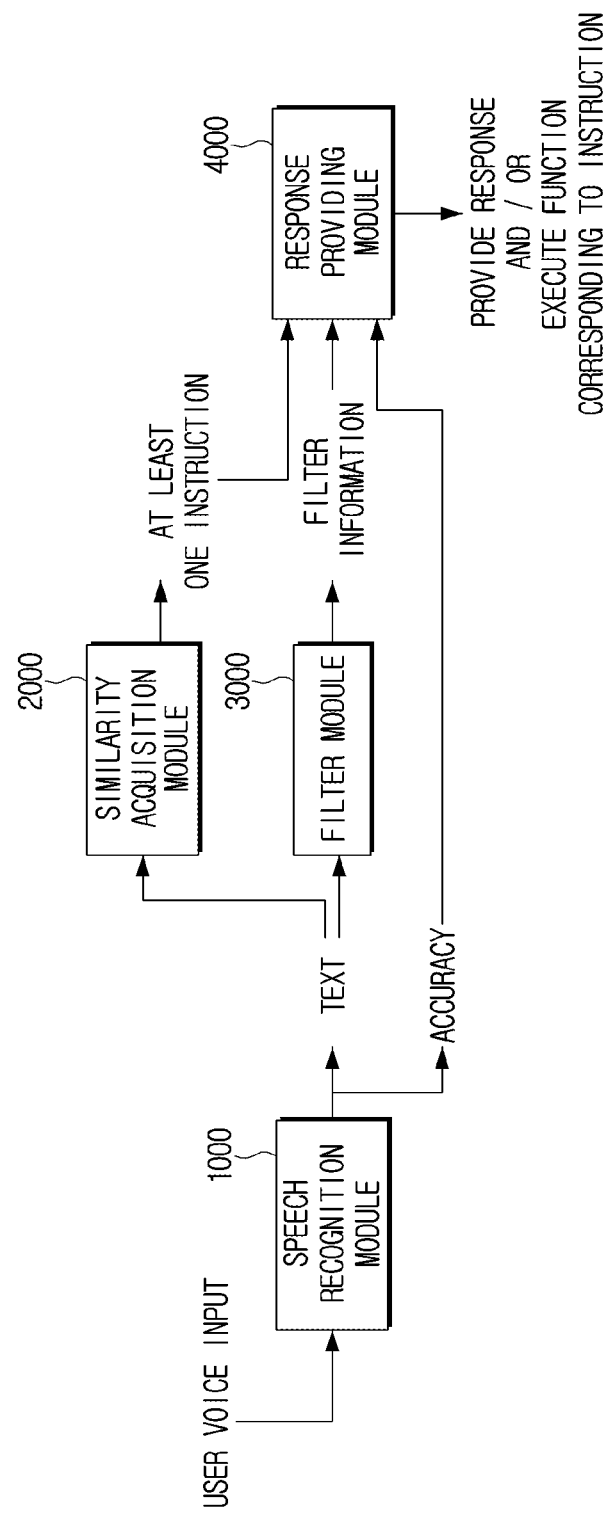
FIG. 2 is a diagram illustrating a specific method of performing execution of a function corresponding to an instruction according to user voice input and providing a response corresponding to a user voice input according to an example embodiment.

FIG. 2 is a diagram illustrating a specific method of performing execution of a function corresponding to an instruction according to user voice input and providing a response corresponding to a user voice input according to an example embodiment.

Referring to FIG. 2, the electronic apparatus 100 may include a speech recognition module 1000, a similarity acquisition module 2000, a filter module 3000, and a response providing module 4000. The electronic apparatus 100 may perform at least one of function execution corresponding to an instruction according to user voice input and response provision corresponding to user voice input through a speech recognition module 1000, a similarity acquisition module 2000, a filter module 3000, and a response providing module 4000. For example, the speech recognition module 1000, the similarity acquisition module 2000, the filter module 3000, and the response providing module 4000 may be stored in the memory 110 of the electronic apparatus 100, and the corresponding modules may be loaded into a memory (e.g., a volatile memory) included in the processor 120. The electronic apparatus 100 may load the plurality of modules 1000-4000 from a non-volatile memory into the volatile memory to execute the functions of the plurality of modules 1000 to 4000. Loading refers to an operation of retrieving data stored in the non-volatile memory and storing the data so that the processor 120 may access. The plurality of modules 1000-4000 may be implemented in respective software, but some modules may be implemented in a combination of hardware and software. In another embodiment, the plurality of modules 1000-4000 may be implemented in one software. In addition, some modules may be implemented within the electronic apparatus 100, and some other modules may be implemented in an external device. Each module may contain processing circuitry.

Referring to FIG. 2, the electronic apparatus 100 may input a user voice input to the speech recognition module 1000 to obtain accuracy of text and text corresponding to the user voice input. The speech recognition module 1000 may include an ASR model for recognizing a user voice input and converting the voice into text. For example, the electronic apparatus 100 may pre-process the user voice input to input the obtained voice signal to the speech recognition module 1000 to obtain the accuracy of the text and text corresponding to the user voice input. The accuracy may indicate a value for the accuracy between the user voice input inputted to the speech recognition module 1000 and the text output from the speech recognition module 1000, and the higher the accuracy, the user voice input to the speech recognition module 1000 may be reflected better.

For example, the speech recognition module 1000 for obtaining text corresponding to a user voice input may be operated by an external speech to text (STT) server that converts an audio signal corresponding to a user voice input into text. In this case, the electronic apparatus 100 may send a user voice input to an external STT server and receive accuracy for text and text corresponding to the user voice input from the external STT server.

The electronic apparatus 100 may input the text obtained by the speech recognition module 1000 to the similarity acquisition module 2000 to obtain at least one instruction. The similarity acquisition module 2000 may be a module for identifying an instruction corresponding to a user voice input among a plurality of stored instructions. Here, the at least one instruction may be at least one instruction corresponding to a user voice input among a plurality of instructions pre-stored in the electronic apparatus 100. As an example, the similarity acquisition module 2000 may obtain similarity between a plurality of pre-stored instructions and texts corresponding to a user voice input obtained through the speech recognition module 1000, and identify at least one of a plurality of instructions based on the obtained similarity. Specifically, the similarity acquisition module 2000 may obtain similarity between each of a plurality of instructions pre-stored in the electronic apparatus 100 and text corresponding to a user voice input obtained through the speech recognition module 1000 by using an algorithm capable of digitizing similarity such as an Euclidean similarity measurement method or a similarity measurement method through machine learning.

The similarity acquisition module 2000 may identify at least one instruction that has a similarity with a text corresponding to the user voice input obtained through the speech recognition module 1000 is higher than a threshold value (e.g., 0.7) among the plurality of instructions. As another embodiment, if it is not identified one instruction that has a similarity with the text corresponding to the user voice input obtained through the speech recognition module 1000 model among the plurality of instructions above a threshold value (e.g., 0.7), the similarity acquisition module 2000 may identify an instruction of a predetermined number (e.g., three) having a high degree of similarity with the text corresponding to the user voice input obtained through the speech recognition module 1000 among the plurality of instructions.

The electronic apparatus 100 may input the text obtained by the speech recognition module 1000 to the filter module 3000 to obtain filter information corresponding to the user voice input. The filter module 300 may be a module for identifying whether a preset word is included in the text obtained by the speech recognition module 1000. Each "module" herein may comprise circuitry.

If a predetermined first type of word is identified among the words included in the text obtained by the speech recognition module 1000, the filter module 3000, comprising at least one filter, may set the first value corresponding to the filter information according to the word of the first type to be higher. If a predetermined second type of word is identified among the words included in the text obtained by the speech recognition module 1000, the filter module 3000 may set the first value corresponding to the filter information to be lowered according to the second type of word.

The first of word may include a word corresponding to compliment or a positive word, and the second type of word may include a word corresponding to a curse word or a negative word. However, the disclosure is not limited thereto, and the first type of word may include a word type to provide a response type as an aggressive response, and the second type of word may include a word type to provide a response type as a minimized response. As an example, if the user is cooking in a kitchen, the user may be inconvenient to control the electronic apparatus 100, and thus the word corresponding to the kitchen or cooking may be set to the word of the first type. In addition, if a word corresponding to a kitchen or cooking is identified, the filter module 3000 may control to increase the first value and provide a response in a direction that provides an aggressive response. For example, if a user is located in a living room or a bedroom, the user may easily control the electronic apparatus 100 so as to set a word corresponding to the living room or the bedroom as a second type of word. If a word corresponding to the living room or the bedroom is identified, the filter module 3000 may control to lower the first value to provide a response in a direction that provides a minimized response. Such a first type of word and a second type of word may be pre-set by the manufacturer of the electronic apparatus 100, or set by the user.

The response providing module 4000 may perform at least one of a response providing corresponding to the user voice input and a function execution corresponding to the instruction according to the user voice input based on at least one instruction, the filter information, and the accuracy of the text. The response providing module 4000 may be a module for providing a response corresponding to a user voice input. Specifically, the response providing module 4000 may identify an operation corresponding to a user voice input of the plurality of preset operations based on a value obtained by summing the first value obtained through the filter information and the second value obtained through the accuracy. As described above, the filter module 3000 sets the first value based on the filter information, and in this case, the filter information may also include information on the first value. However, the disclosure is not limited thereto, but for example, the filter module 3000 may obtain filter information indicating whether a preset word is included in the text, and may set the first value based on the filter information in the response providing module 4000.

The response providing module 4000 may set the second value corresponding to the accuracy to be lowered (e.g., 0), as the higher the accuracy value (e.g., 1) of the text obtained by the speech recognition module 1000, and increase the second value (e.g., 1) corresponding to the accuracy as the accuracy value is lower (e.g., 0). The response providing module 4000 provides a response in a direction that provides an aggressive response as the accuracy of the text obtained by the speech recognition module 1000 is low, and may control the response providing module 4000 to provide a response in a direction that provides a minimized response as the accuracy value is high.

The response providing module 4000 may identify an operation corresponding to a user voice input of the plurality of preset operations based on a value obtained by summing the first value and the second value. For example, the range of summed values may range from 0 to 1, and may be lower than 0 or higher than 1 depending on the first value and the second value. For example, if the summed value is identified as being present in the first range (greater than 0.8), the response providing module 4000 may identify an operation corresponding to the user voice input as a first operation. If the summed value is identified as being present in the second range (greater than 0.6 and less than or equal to 0.8), the response providing module 4000 may identify an operation corresponding to the user voice input as a second operation. If the summed value is identified as being present in the third range (greater than 0.4 and less than or equal to 0.6), the response providing module 4000 may identify an operation corresponding to the user voice input as a third operation. If the summed value is identified as being present in the fourth range (greater than 0.2 and less than or equal to 0.4), the response providing module 4000 may identify an operation corresponding to the user voice input as a fourth operation. If the summed value is identified as being present in the fifth range (0.2 or less), the response providing module 4000 may identify an operation corresponding to the user voice input as a fifth operation.

The response providing module 4000 may identify whether to execute a function about an instruction corresponding to the user voice input based on at least one instruction.

For example, if it is identified that at least one instruction of which a similarity with the text is above a threshold value (e.g., 0.7) is present among a preset plurality of instructions in the similarity acquisition module 2000, the response providing module 4000 may identify that a function for an instruction corresponding to the user voice input is executed. If it is not identified an instruction of which a similarity with the text is higher than a threshold value (e.g., 0.7) among the plurality of prestored instructions is present in the similarity acquisition module 2000, the response providing module 4000 may identify that the function of the instruction corresponding to the user voice input is not executed.

When identified as executing a function for the instruction, the response providing module 4000 may perform a function corresponding to one of the identified at least one instruction and perform a response corresponding to the user voice input based on the identified operation. If it is identified that the function of the instruction is not executed, the response providing module 4000 may perform a response corresponding to the user voice input based on the identified operation without executing the function corresponding to the instruction.

For embodiments that provide various responses depending on the type of operation corresponding to the identified user voice input and whether the function corresponding to the command is executed will be described below through FIGS. 3A to 7B.

Although the functions for performing at least one of the function execution corresponding to the instruction according to the user voice input and the response providing corresponding to the user voice input are implemented in the electronic apparatus 100 in FIG. 2, the disclosure is not limited thereto.

As an example, the functions performed by the speech recognition module 1000, the similarity acquisition module 2000, the filter module 3000, and the response providing module 4000 according to FIG. 2 may be performed by an external server. In this case, the electronic apparatus 100 may transmit a user voice input to an external server to receive information for performing at least one of a function execution corresponding to an instruction according to a user voice input from an external server and a response provision corresponding to a user voice input. The electronic apparatus 100 may perform at least one of a function execution corresponding to an instruction according to a user voice input and a response providing corresponding to a user voice input using the received information.

For example, as described above, when the speech recognition module 1000 is operated in an external STT server, the similarity acquisition module 2000, the filter module 3000, and the response providing module 4000 may also be operated by an external STT server.

According to an embodiment, when the speech recognition module 1000 is operated in an external STT server to obtain text and accuracy, the STT server may transmit text and accuracy to another server in which the function of the similarity acquisition module 2000, the filter module 3000, and the response providing module 4000 is performed. In addition, the electronic apparatus 100 may receive information for performing at least one of a function execution corresponding to an instruction according to a user voice input from another server and a response provision corresponding to a user voice input. The electronic apparatus 100 may perform at least one of a function execution corresponding to an instruction according to a user voice input and a response providing corresponding to a user voice input using the received information.

Figure 3A:
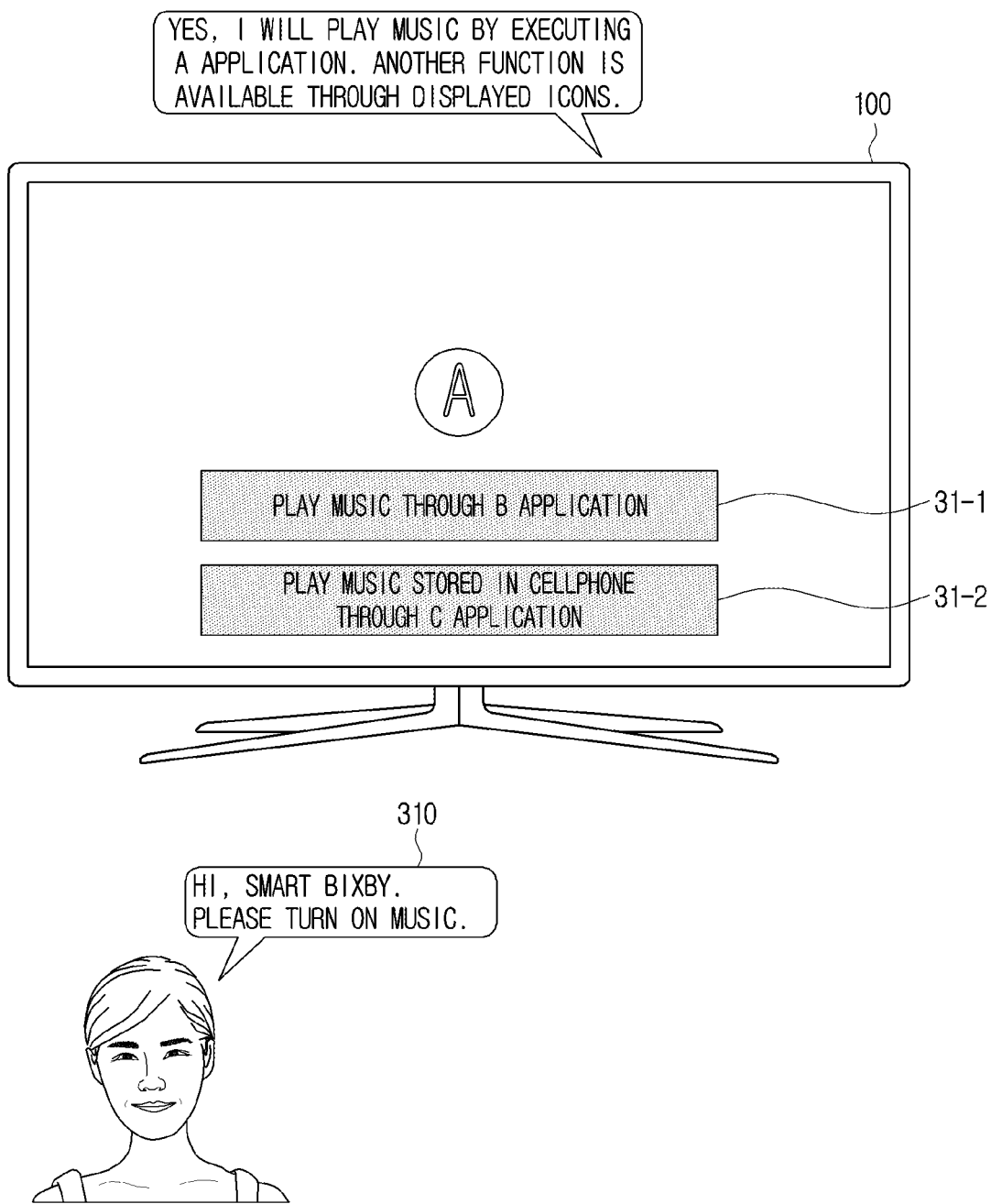
FIG. 3A is a diagram illustrating an embodiment in which an operation corresponding to the user voice input is identified as a first operation and a function of an instruction corresponding to user voice input is executed according to an example embodiment.

FIG. 3A is a diagram illustrating an embodiment in which an operation corresponding to the user voice input is identified as a first operation and a function of an instruction corresponding to user voice input is executed according to an example embodiment.

Referring to FIG. 3A, the user may utter first user voice input 310 of the "Hi, smart Bixby, please turn on music." Here, the "Bixby" may be a trigger sound for activating the speech recognition function of the electronic apparatus 100, and the trigger speech may vary depending on the speech recognition system. The electronic apparatus 100 may receive the first user voice input 310, identify an operation corresponding to the first user voice input 310, and identify whether to execute a function for the instruction corresponding to the first user voice input 310.

For example, if accuracy of the text which is output by inputting the first user voice input 310 to the ASR model may not be high (e.g., less than 0.5), the second value may be set to be high (e.g., 0.6). Since the first user voice input 310 includes a word of the first type corresponding to the compliment such as "smart", the first value may be set to be high (e.g., +0.1) based on the word "smart". In addition, the words included in the first user voice input 310 such as "high," "Bixby" may be identified as a word of the first type, and thus the first value may be set to be high (e.g., +0.2) based on "Hi", "Bixby". That is, the word of the first type is not limited to the word corresponding to the "complement", and the positive word types may also be included in the first type of word. Accordingly, the first value may be set to be high (e.g., +0.3) by reflecting a word of the "smart", "hi", and "Bixby". In this case, the electronic apparatus 100 may identify that a value obtained by summing the first value and the second value is present in the first range (greater than 0.8) and identify an operation corresponding to the first user voice input 310 as a first operation.

The electronic apparatus 100 may identify at least one instruction that is similar to the text corresponding to the first user voice input 310 of the plurality of pre-stored instructions. According to the embodiment of FIG. 3A, the at least one instruction may include a first instruction for playing music by executing an A application a second instruction for playing music by executing the B application; and a third instruction for playing music stored in the electronic apparatus 100 through the C application.

The electronic apparatus 100 may identify an instruction to execute a function of an instruction among the first instruction, the second instruction, and the third instruction as a first instruction according to the embodiments described in FIGS. 1 and 2. As an example, the first instruction may have the highest similarity with the text corresponding to the first user voice input 310.

The electronic apparatus 100 may provide a response according to the first operation while executing the function corresponding to the first instruction. The electronic apparatus 100 may play music while executing the A application according to the first instruction. The electronic apparatus 100 may provide a list corresponding to the second instruction and the third instruction. Referring to FIG. 3A, the electronic apparatus 100 may reproduce music while executing the A application according to the first instruction, and display an icon 31-1 for executing a function corresponding to the second instruction, and an icon 31-2 for executing a function corresponding to the third instruction on the display of the electronic apparatus 100. The electronic apparatus 100 may execute a function of the first instruction, and may output a voice informing that a list corresponding to the second instruction and the third instruction has been provided. For example, if the icon 31-1 for executing the function corresponding to the second instruction is selected, the electronic apparatus 100 may execute the B application according to the second instruction to play the music. For example, if the icon 31-2 for executing the function corresponding to the third instruction is selected, the electronic apparatus 100 may play the music stored in the electronic apparatus 100 through the C application according to the third instruction.

Figure 3B:
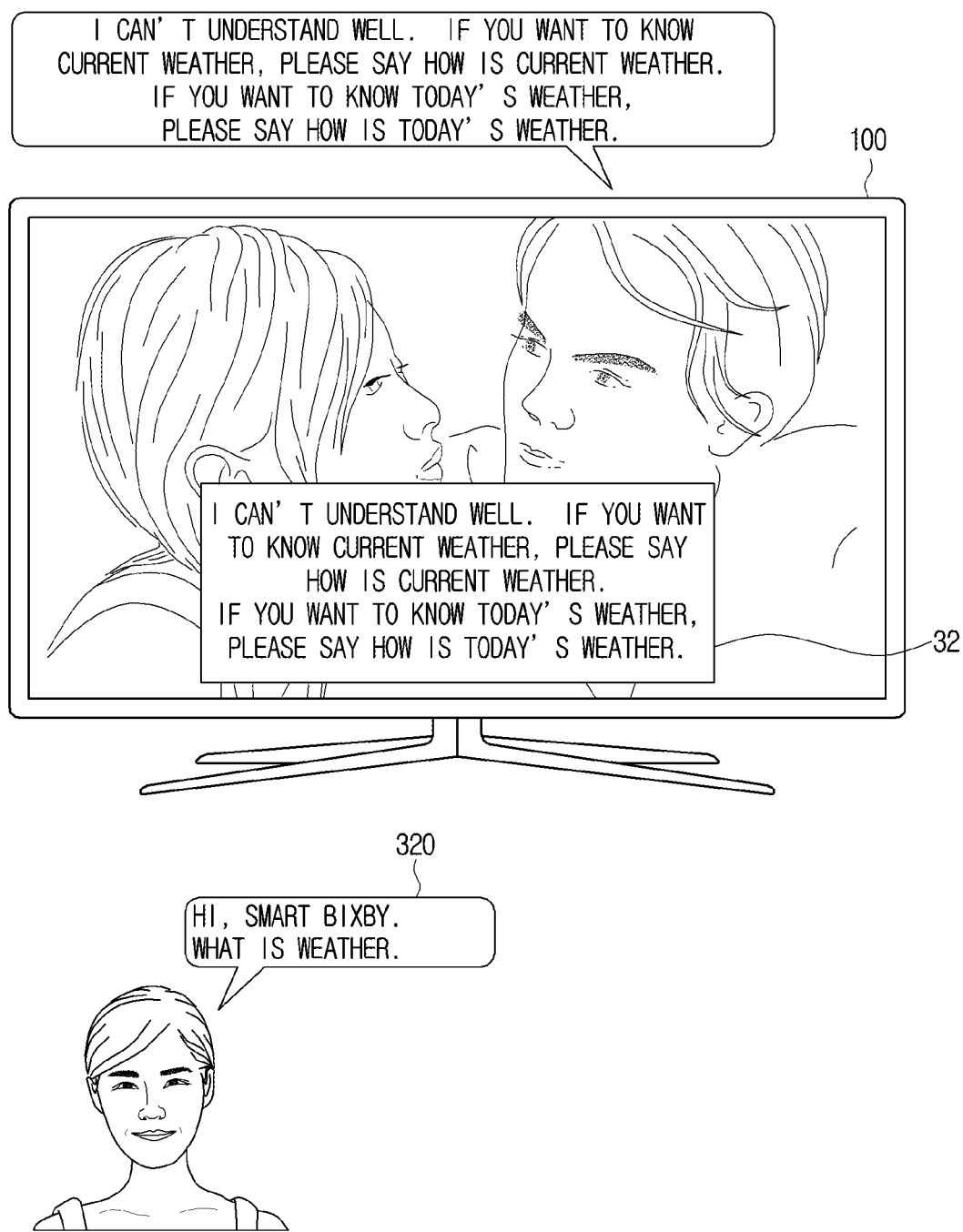
FIG. 3B is a diagram illustrating an embodiment in which an operation corresponding to the user voice input is identified as a first operation and a function of an instruction corresponding to user voice input is not executed according to an example embodiment.

FIG. 3B is a diagram illustrating an embodiment in which an operation corresponding to the user voice input is identified as a first operation and a function of an instruction corresponding to user voice input is not executed according to an example embodiment.

Referring to FIG. 3B, the user may utter the second user voice input 320 of the "Hi, smart Bixby, what is weather". The electronic apparatus 100 may receive the second user voice input 320, identify an operation corresponding to the second user voice input 320, and identify whether to execute a function for the instruction corresponding to the second user voice input 320.

For example, accuracy of the text output by inputting the second user voice input 320 to the ASR model is not high (e.g., less than 0.5), the second value may be set to be high (e.g., 0.6). In addition, the words included in the first user voice input 310 such as "hi', "Bixby" may be identified as a word of the first type, and thus the first value may be set to be high (e.g., +0.2) based on the "hi", 'Bixby." The word of the first type is not limited to the word corresponding to the "compliment", and the positive word types may also be included in the first type of word. Accordingly, the first value may be set to be high (e.g., +0.3) by reflecting words of "smart", "hi", and "Bixby". In this case, the electronic apparatus 100 may identify that a value obtained by summing the first value and the second value is present in the first range (greater than 0.8) and identify an operation corresponding to the first user voice input 310 as a first operation.

The electronic apparatus 100 may identify that there is no instruction of which a similarity with text corresponding to the second user voicer input 320 exceeds a threshold (e.g., 0.7), among the plurality of pre-stored instructions. The electronic apparatus 100 may identify a predetermined number (e.g., two) of instructions having a high similarity with a text corresponding to a second user voice input 320 among a plurality of pre-stored instructions. As an example, the electronic apparatus 100 may identify a fourth instruction that informs information about weather of a current time and a fifth instruction that informs information about the weather of today. The fourth and fifth instructions may be two instructions having the highest similarity, although the similarity between the text corresponding to the second user voice input 320 does not exceed a threshold (e.g., 0.7). Since the similarity between the fourth instruction and the fifth instruction and the text corresponding to the second user voice input 320 does not exceed a threshold value, the electronic apparatus 100 may identify that the instruction corresponding to the second user voice input 320 is not executed.

The electronic apparatus 100 may provide the UI 32 for guiding function execution corresponding to the instruction. The electronic apparatus 100 may display the UI 32 for guiding the execution of the function corresponding to the fourth instruction or the fifth instruction on the display. The electronic apparatus 100 may output a voice for guiding execution of a function corresponding to the instruction. If the user utters a voice input corresponding to the fourth instruction according to the UI 32, the electronic apparatus 100 may execute a function corresponding to the fourth instruction. In addition, if the user utters a voice input corresponding to the fourth instruction according to the UI 32, the electronic apparatus 100 may execute a function corresponding to the fourth instruction.

Figure 4A:
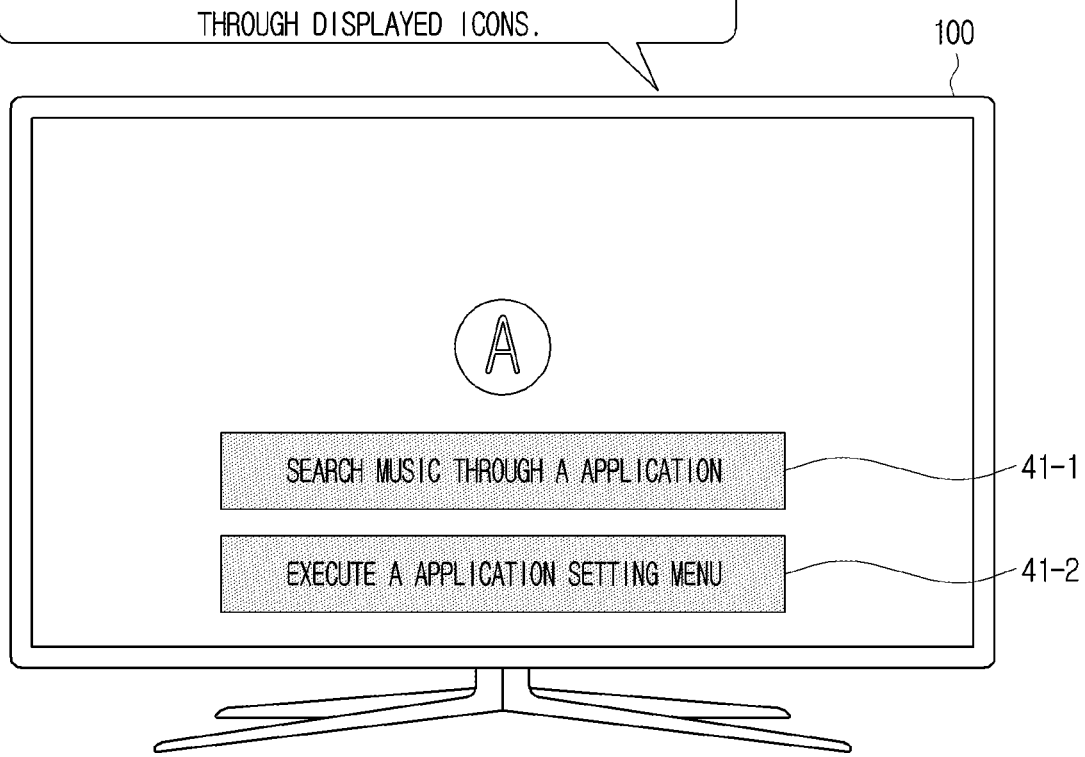
FIG. 4A is a diagram illustrating an embodiment in which an operation corresponding to the user voice input is identified as a second operation and a function of an instruction corresponding to user voice input is executed according to an example embodiment.
Figure 4A:

FIG. 4A is a diagram illustrating an embodiment in which an operation corresponding to the user voice input is identified as a second operation and a function of an instruction corresponding to user voice input is executed according to an example embodiment.

Referring to FIG. 4A, a user may utter a third user voice input 410 "Good morning. Please turn on music". The electronic apparatus 100 may receive the third user voice input 410, identify an operation corresponding to the third user voice input 410, and identify whether to execute a function for the instruction corresponding to the third user voice input 410.

For example, accuracy of the text output by inputting the third user voice input 410 to the ASR model is not high (e.g., less than 0.5), the second value may be set to high (e.g., 0.6). Since the third user voice input 410 includes a "good morning" corresponding to a positive word type, the first value may be set to high (e.g., +0.1). In this case, the electronic apparatus 100 may identify that a value (e.g., 0.7) obtained by summing the first value and the second value is present in the second range (e.g., greater than 0.6 and less than or equal to 0.8), and identify an operation corresponding to the third user voice input 410 as a second operation.

The electronic apparatus 100 may identify at least one instruction of which a similarity with a text corresponding to the third user voice input 410 is higher than a threshold value among the plurality of pre-stored instructions. According to the embodiment of FIG. 4A, the at least one instruction may include a first instruction for playing music by executing an A application; a second instruction for playing music by executing the B application; and a third instruction for playing music stored in the electronic apparatus 100 through the C application. The electronic apparatus 100 may identify an instruction for executing the functions of the first instruction, the second instruction, and the third instruction as the first instruction according to the embodiments described in FIGS. 1 and 2. As an example, the first instruction may have the highest similarity with the text corresponding to the third user voice input 410.

The electronic apparatus 100 may provide a response according to the second operation while executing a function corresponding to the first instruction. The electronic apparatus 100 may play music while executing application A according to the first instruction. The electronic apparatus 100 may provide a list of related instructions that may be provided after the function for the first instruction is executed. Referring to FIG. 4A, the electronic apparatus 100 may play music while executing the application A according to the first instruction, and may display an icon 41-1 for searching for music with the application A on the display of the electronic apparatus 100 and an icon 41-2 for executing the A application setting menu. The electronic apparatus 100 may output a voice indicating that the function for the first instruction is executed and the related instruction list is provided.

Figure 4B:
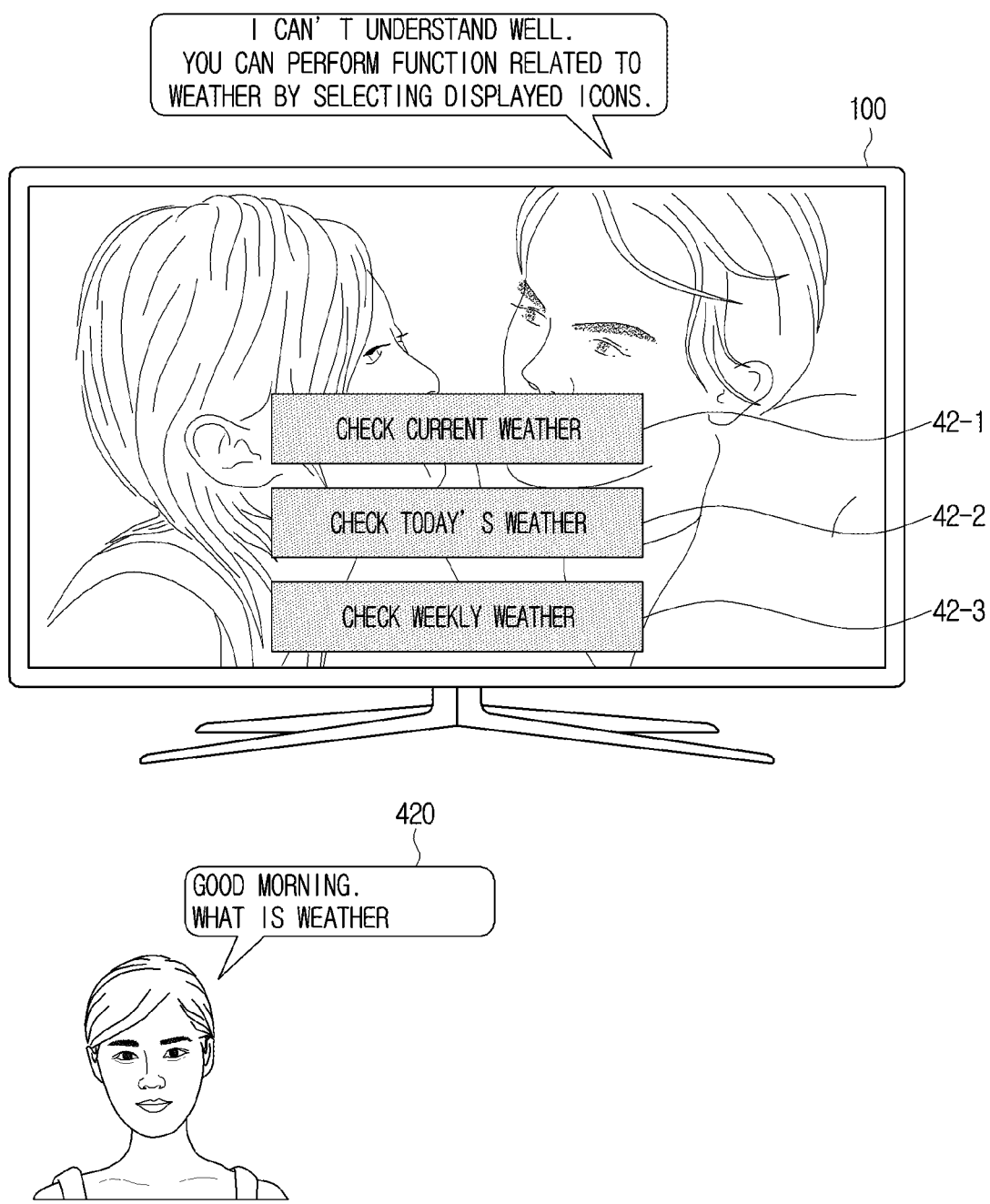
FIG. 4B is a diagram illustrating an embodiment in which an operation corresponding to the user voice input is identified as a second operation and a function of an instruction corresponding to user voice input is not executed according to an example embodiment.

FIG. 4B is a diagram illustrating an embodiment in which an operation corresponding to the user voice input is identified as a second operation and a function of an instruction corresponding to user voice input is not executed according to an example embodiment.

Referring to FIG. 4B, the user may utter a fourth user voice input 420 of "Good morning, what is the weather" The electronic apparatus 100 may receive the fourth user voice input 420, identify an operation corresponding to the fourth user voice input 420, and identify whether to execute a function corresponding to an instruction corresponding to the fourth user voice input 420.

For example, the second value may be set to be high (e.g., 0.6) because the accuracy of the text output by inputting the fourth user voice input 420 into the ASR model is not high (e.g., less than 0.5). Since the fourth user voice input 420 includes the word 'good morning' corresponding to the positive word type, the first value may be set high (e.g., +0.1). In this example, the electronic apparatus 100 may identify that the sum of the first value and the second value (e.g., 0.7) is within the second range (e.g., greater than 0.6 and less than or equal to 0.8), and the operation corresponding to the fourth user voice input 420 may be identified as the second operation.

The electronic apparatus 100 may identify that there is no instruction having a similarity with a text corresponding to the fourth user voice input 420 greater than a threshold value (e.g., 0.7) among a presorted plurality of instructions. The electronic apparatus 100 may identify an instruction of a predetermined number (e.g., three) having a high similarity with a text corresponding to the fourth user voice input 420 among prestored plurality of instructions. For example, the electronic apparatus 100 may identify a fourth instruction indicating information about weather of current time, a fifth instruction indicating weather of today, and a sixth instruction indicating information about a weekly weather. The fourth instruction, fifth instruction, and sixth instruction may be an instruction which has a similarity with a text corresponding to the fourth user voice input 420 not exceeding a threshold value (e.g., 0.7) but has the highest similarity. Each of the fourth instruction, fifth instruction, and sixth instruction may have a similarity with text corresponding to the fourth user voice input 420 not exceeding a threshold value, the electronic apparatus 100 may identify that an instruction corresponding to the fourth user voice input 420 is not executed.

The electronic apparatus 100 may provide a list corresponding to a fourth instruction, a fifth instruction, and a sixth instruction. Referring to FIG. 4B, the electronic apparatus 100 may display an icon 42-1 for confirming the current weather according to a fourth instruction and an icon 42-2 for confirming the weather of today according to the fifth instruction, and an icon 42-3 for confirming the weekly weather according to the sixth instruction. The electronic apparatus 100 may output a voice indicating that a function corresponding to the fourth user voice input 420 has not been executed, and that a list corresponding to the fourth instruction, the fifth instruction, and the sixth instruction has been provided.

If the icon 42-1 corresponding to the fourth instruction is selected, the electronic apparatus 100 may execute a function corresponding to the fourth instruction. If the icon 42-2 corresponding to the fifth instruction is selected, the electronic apparatus 100 may execute a function corresponding to the fifth instruction. If the icon 42-3 corresponding to the sixth instruction is selected, the electronic apparatus 100 may execute the function corresponding to the sixth instruction.

Figure 5A:
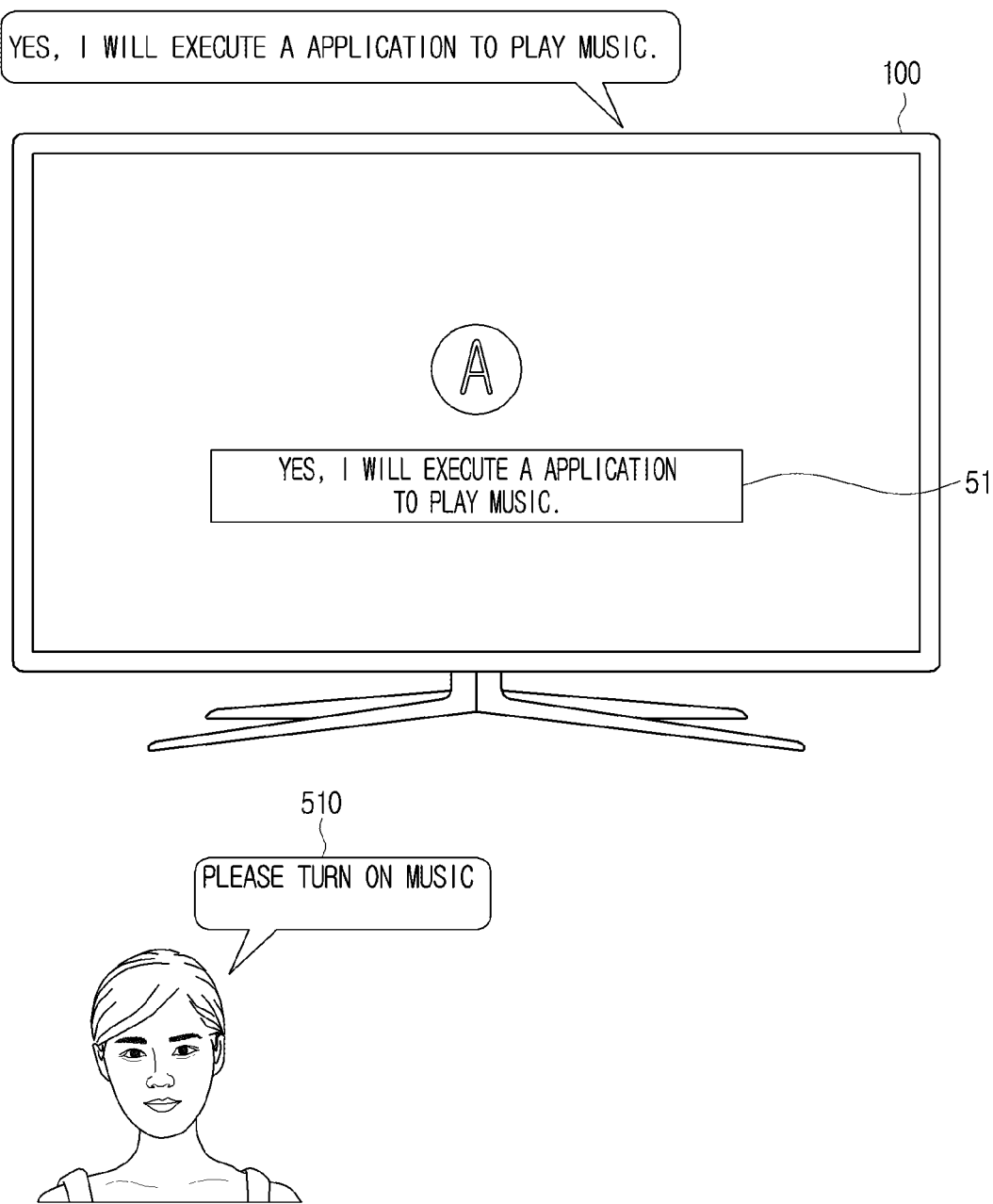
FIG. 5A is a diagram illustrating an embodiment in which an operation corresponding to the user voice input is identified as a third operation and a function of an instruction corresponding to user voice input is executed according to an example embodiment.

FIG. 5A is a diagram illustrating an embodiment in which an operation corresponding to the user voice input is identified as a third operation and a function of an instruction corresponding to user voice input is executed according to an example embodiment.

Referring to FIG. 5A, a user may utter a fifth user voice input 510 of a "please turn on music". The electronic apparatus 100 may receive the fifth user voice input 510, identify an operation corresponding to the fifth user voice input 510, and identify whether to execute a function for the instruction corresponding to the fifth user voice input 510. For example, if the accuracy of the text output by inputting the fifth user voice input 510 to the ASR model is an intermediate range (e.g., 0.3 to 0.7), the second value may be set to a value of an intermediate range (e.g., 0.5). Since the first type of word and the second type of word are not identified in the text (please turn on music) corresponding to the fifth user voice input 510, the first value may be set to a value (e.g., 0) in the middle range. In this example, the electronic apparatus 100 may identify that a value (e.g., 0.5) obtained by summing the first value and the second value as being present in the third range (e.g., greater than 0.4 and less than or equal to 0.6) and identify an operation corresponding to the fifth user voice input 510 as a third operation.

The electronic apparatus 100 may identify at least one instruction of which similarity with the text corresponding to the fifth user voice input 510 exceeds a threshold value among the plurality of pre-stored instructions. According to the embodiment of FIG. 5A, the at least one instruction may include a first instruction for playing music by executing an A application; a second instruction for playing music by executing the B application; and a third instruction for playing music stored in the electronic apparatus 100 through the C application. The electronic apparatus 100 may identify an instruction for executing the functions of the first instruction, the second instruction, and the third instruction as the first instruction according to the embodiments described in FIGS. 1 and 2. As an example, the first instruction may have the highest similarity with the text corresponding to the fifth user voice input 510.

The electronic apparatus 100 may provide a response according to a third operation while executing a function corresponding to the first instruction. The electronic apparatus 100 may play music while executing the A application according to the first instruction. The electronic apparatus 100 may provide text and voice responses corresponding to the executed functionality. Referring to FIG. 5A, the electronic apparatus 100 may reproduce music while executing the A application according to the first instruction, display a text informing that music has been played by executing the A application on the display of the electronic apparatus 100, and output a voice response 51 informing that music has been played by executing the A application.

Figure 5B:
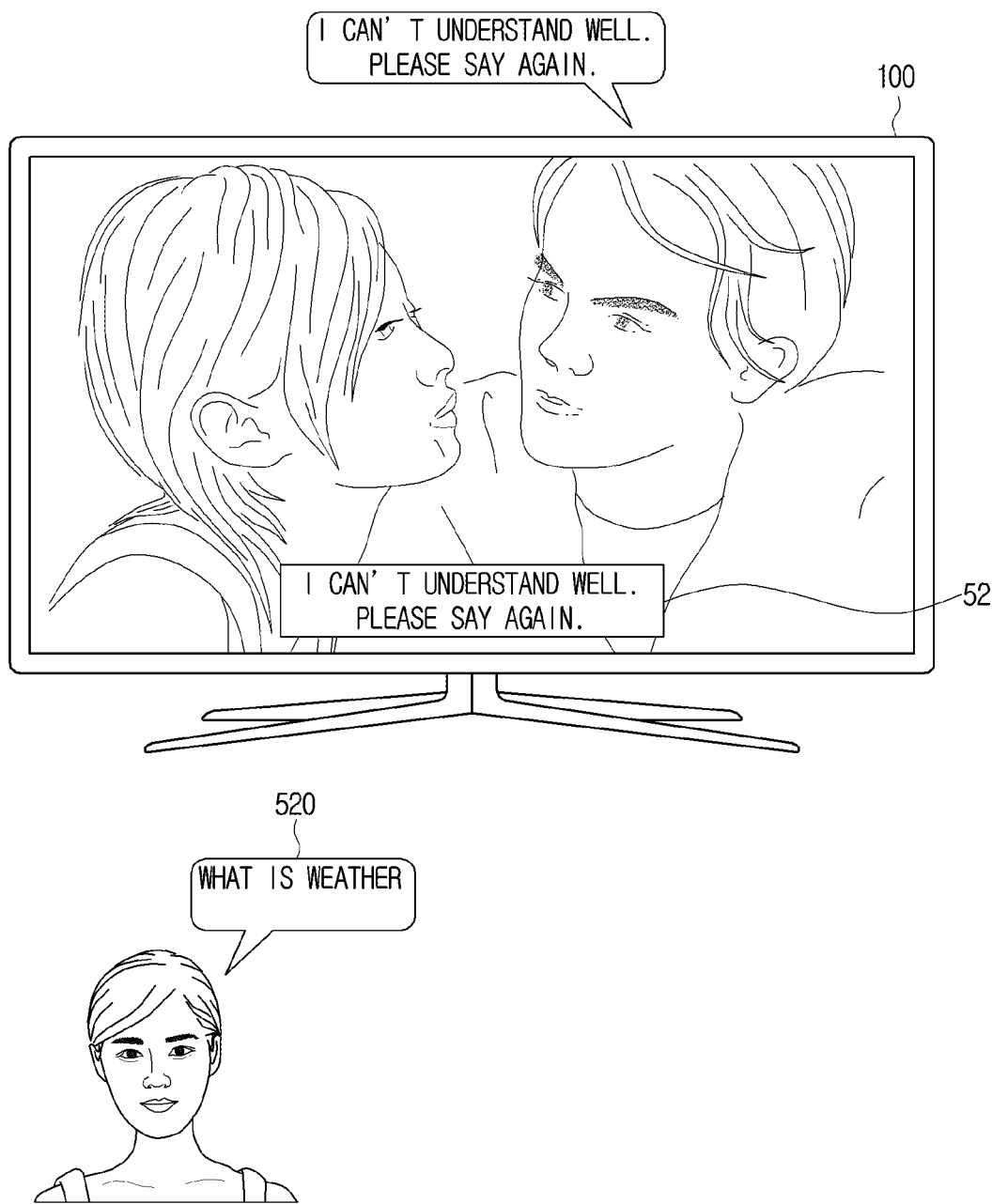
FIG. 5B is a diagram illustrating an embodiment in which an operation corresponding to the user voice input is identified as a third operation and a function of an instruction corresponding to user voice input is not executed according to an example embodiment.

FIG. 5B is a diagram illustrating an embodiment in which an operation corresponding to the user voice input is identified as a third operation and a function of an instruction corresponding to user voice input is not executed according to an example embodiment.

Referring to FIG. 5B, the user may utter a sixth user voice input 520 of the "what is weather". The electronic apparatus 100 may receive the sixth user voice input 520, identify an operation corresponding to the sixth user voice input 520, and identify whether to execute a function for the instruction corresponding to the sixth user voice input 520.

For example, the accuracy of the outputted text by inputting the sixth user voice input 520 is input to the ASR is high (e.g., 0.7 or more) and the second value may be set to be low (e.g., 0.3). In addition, since the first type of word and the second type of word are not identified in the text (what is the weather) corresponding to the sixth user voice input 520, the first value may be set to a value (e.g., 0) in the middle range. In this case, the electronic apparatus 100 may identify a value (e.g., 0.3) obtained by summing the first value and the second value as being present in the second range (e.g., 0.2 to 0.4 or less) and identify an operation corresponding to the sixth user voice input 520 as a third operation.

The electronic apparatus 100 may identify that there is no instruction having a similarity with a text corresponding to the sixth user voice input 520 exceeding a threshold value (e.g., 0.7) among a prestored plurality of instructions. Accordingly, the electronic apparatus 100 may identify that a function corresponding to the sixth user voice input 520 is not executed.

The electronic apparatus 100 may not execute a function corresponding to the sixth user voice input 520, and provide a text and a voice response indicating that the function is not executed according to the third operation. For example, referring to FIG. 5B, the electronic apparatus 100 may display text indicating that a function is not executed on the display. In addition, the electronic apparatus 100 may output a voice response 52 indicating that the function is not executed.

Figure 6A:
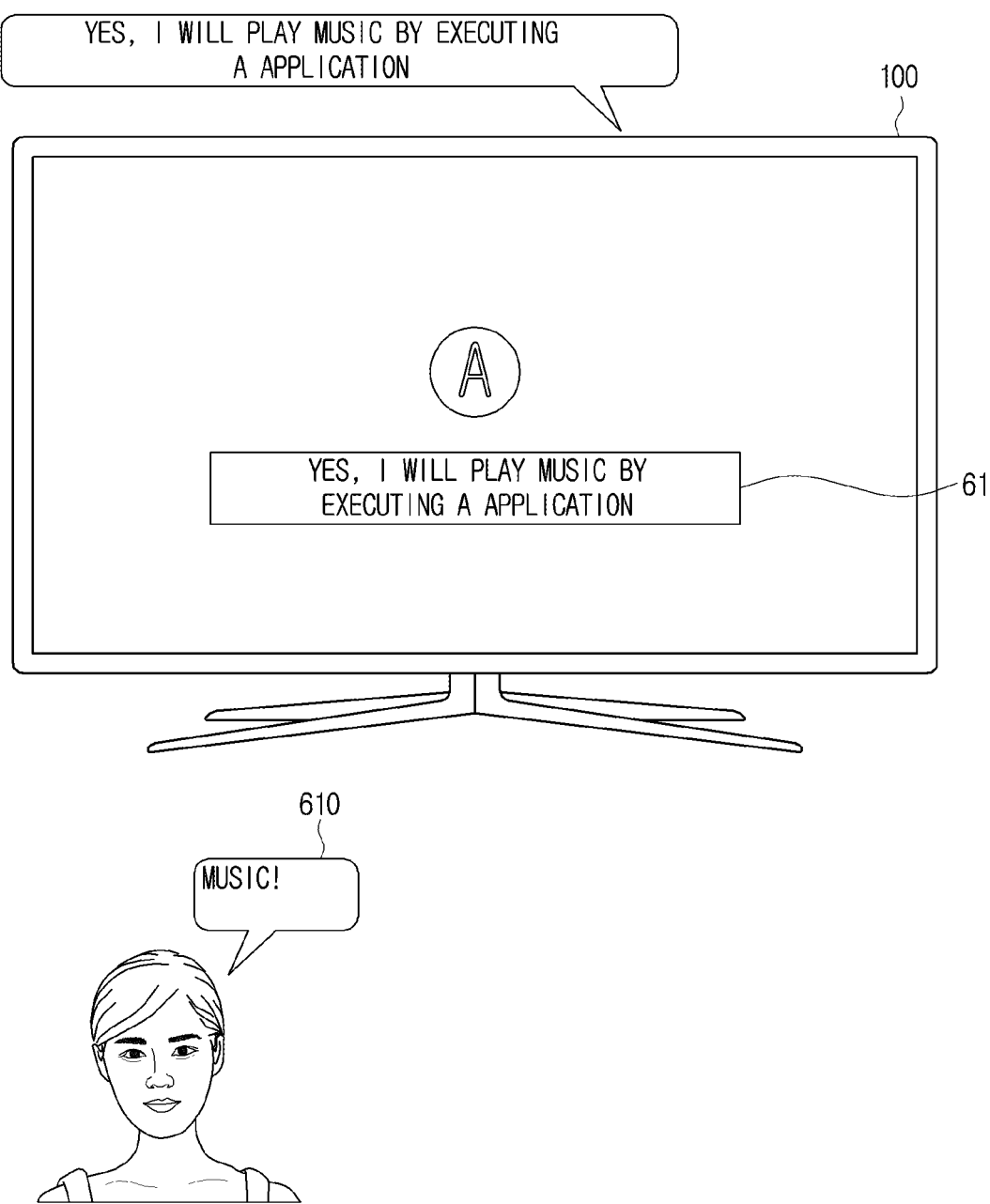
FIG. 6A is a diagram illustrating an embodiment in which an operation corresponding to the user voice input is identified as a fourth operation and a function of an instruction corresponding to user voice input is executed according to an example embodiment.

FIG. 6A is a diagram illustrating an embodiment in which an operation corresponding to the user voice input is identified as a fourth operation and a function of an instruction corresponding to user voice input is executed according to an example embodiment.

Referring to FIG. 6A, the user may utter a seventh user voice input 610 of "Music!". The electronic apparatus 100 may receive the seventh user voice input 610, identify an operation corresponding to the seventh user voice input 610, and identify whether to execute a function for the instruction corresponding to the seventh user voice input 610.

For example, if accuracy of a text outputted by inputting the seventh user voice input 610 to the ASR model is high (e.g., 0.7), the second value may be set to a low value (e.g., 0.3). Since the first type of word and the second type of word are not identified in the text (music) corresponding to the seventh user voice input 610, the first value may be set to a value (e.g., 0) in the middle range. In this case, the electronic apparatus 100 may identify a value (e.g., 0.3) obtained by summing the first value and the second value as being present in the fourth range (e.g., 0.2 to 0.4 or less) and identify an operation corresponding to the seventh user voice input 610 as a fourth operation.

The electronic apparatus 100 may identify at least one instruction that is similar to the text corresponding to the seventh user voice input 610 exceeding a threshold value, among the plurality of pre-stored instructions. The at least one instruction according to the embodiment of FIG. 6A may include a first instruction for playing music by executing an A application, a second instruction for playing music by executing the B application, and a third instruction for playing music stored in the electronic apparatus 100 through the C application. The electronic apparatus 100 may identify an instruction for executing the functions of the first instruction, the second instruction, and the third instruction as the first instruction according to the embodiments described in FIGS. 1 and 2. As an example, the first instruction may have the highest similarity with the text corresponding to the seventh user voice input 610.

The electronic apparatus 100 may provide a response according to a fourth operation while executing a function corresponding to the first instruction. The electronic apparatus 100 may play music while executing the A application according to the first instruction. In addition, the electronic apparatus 100 may provide text 61 corresponding to the executed function. Referring to FIG. 6A, the electronic apparatus 100 may reproduce music while executing the A application according to the first instruction, and display a text 61 informing that music has been played by executing the A application on the display of the electronic apparatus 100.

Figure 6B:
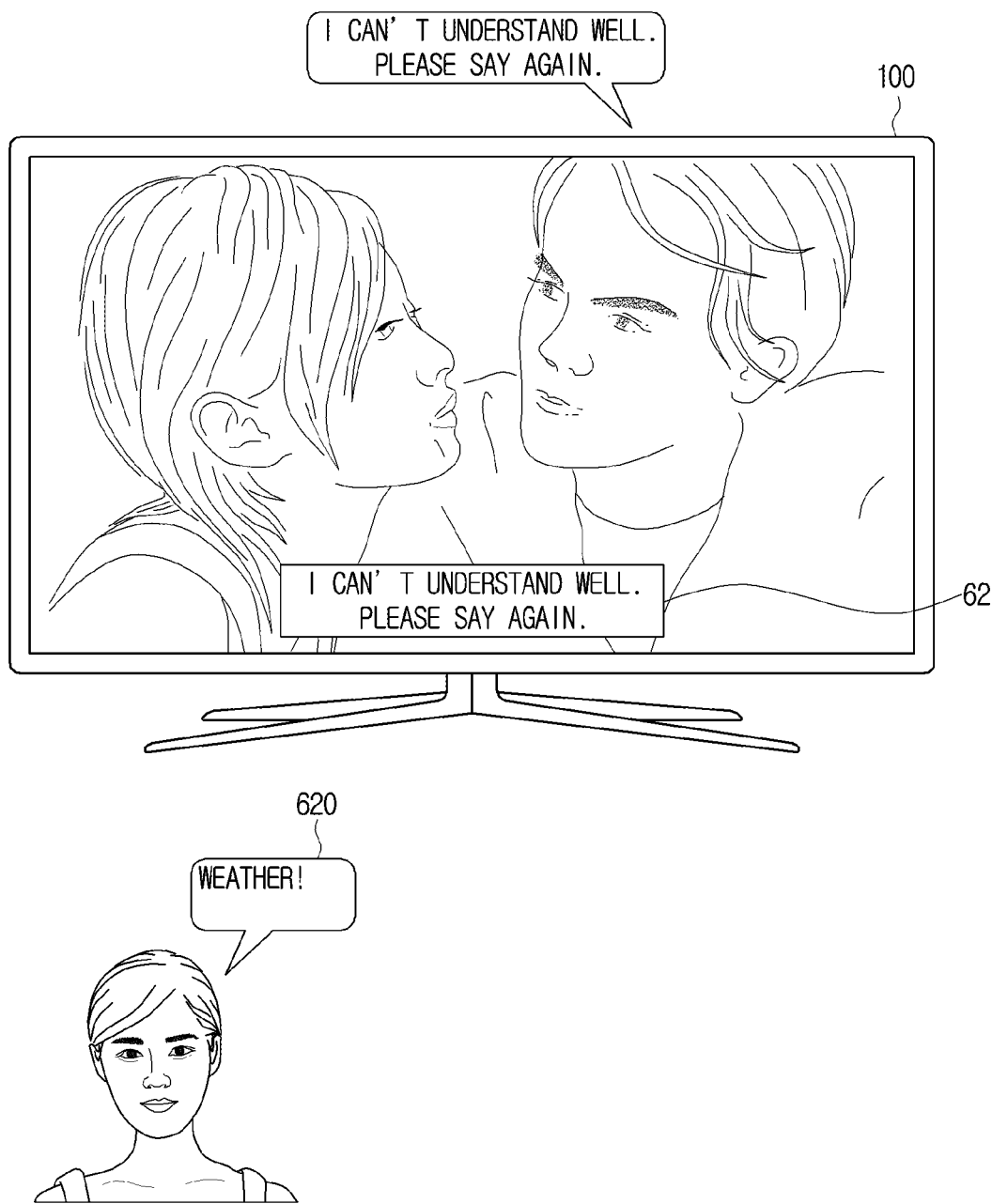
FIG. 6B is a diagram illustrating an embodiment in which an operation corresponding to the user voice input is identified as a fourth operation and a function of an instruction corresponding to user voice input is not executed according to an example embodiment.

FIG. 6B is a diagram illustrating an embodiment in which an operation corresponding to the user voice input is identified as a fourth operation and a function of an instruction corresponding to user voice input is not executed according to an example embodiment.

Referring to FIG. 6B, the user may utter the eighth user voice input 620 of "Weather!". The electronic apparatus 100 may receive an eighth user voice input 620, identify an operation corresponding to the eighth user voice input 620, and identify whether to execute a function for the instruction corresponding to the eighth user voice input 620.

For example, when the accuracy of the text outputted by inputting the eighth user voice input 620 to the ASR model is high (e.g., 0.7), the second value may be set to a low value (e.g., 0.3). In the text (weather) corresponding to the eighth user voice input 620, the first type of word and the second type of word are not identified, and the first value may be set to a value (e.g., 0) in the middle range. In this case, the electronic apparatus 100 may identify that the sum of the first value and the second value (e.g., 0.3) is within the fourth range (e.g., greater than 0.2 and less than or equal to 0.4), and may identify an operation corresponding to the eighth user voice input 620 as a fourth operation.

The electronic apparatus 100 may identify that there is no instruction of which similarity with the text corresponding to the eighth user voice input 620 exceeds a threshold (e.g., 0.7) among a plurality of pre-stored instructions. Accordingly, the electronic apparatus 100 may identify that the function corresponding to the eighth user voice input 620 is not executed.

The electronic apparatus 100 may not execute a function corresponding to the eighth user voice input 620 and may provide a response indicating that the function is not executed according to the fourth operation. For example, referring to FIG. 6B, the electronic apparatus 100 may display text 62 indicating that a function is not executed on the display.

Figure 7A:
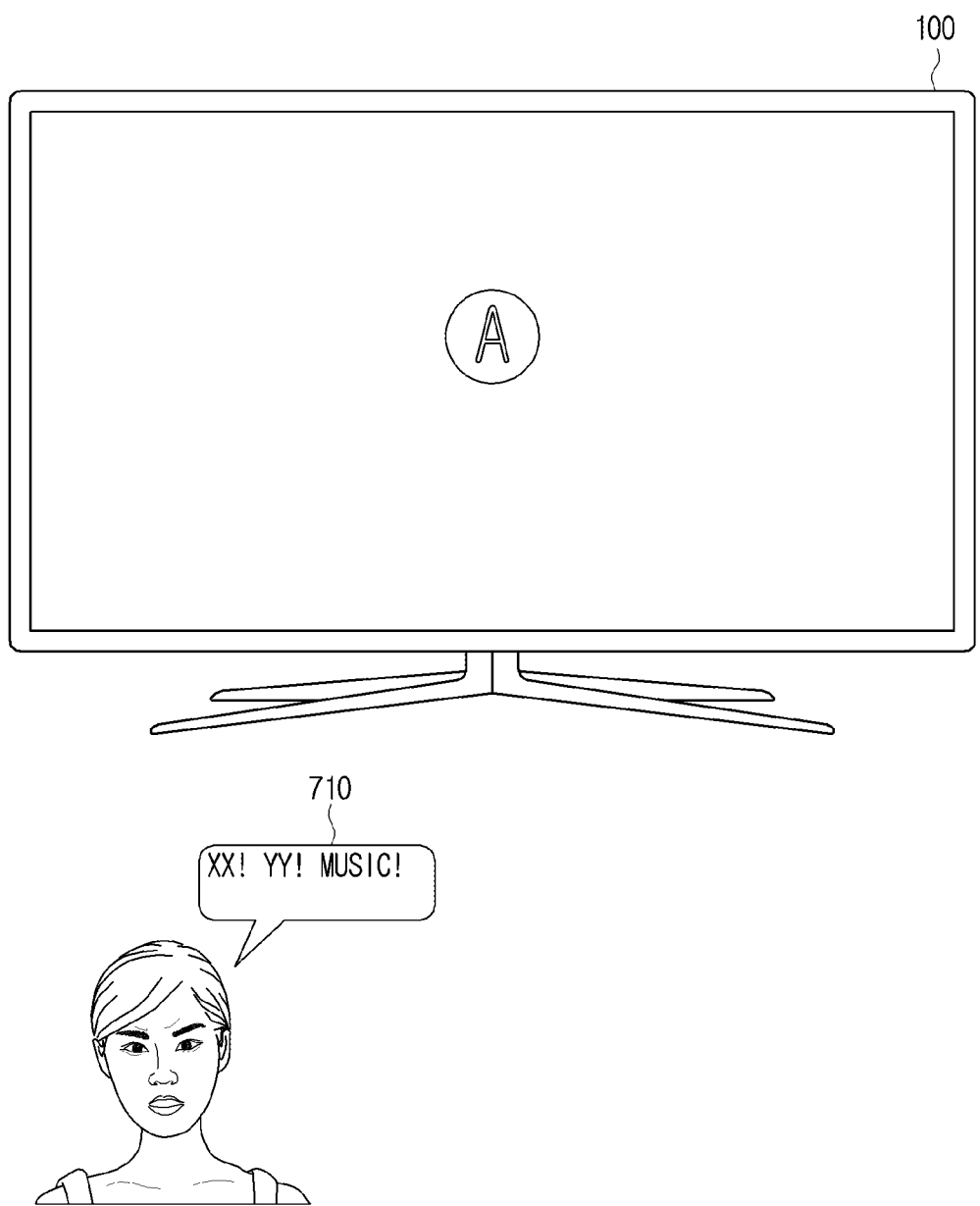
FIG. 7A is a diagram illustrating an embodiment in which an operation corresponding to the user voice input is identified as a fifth operation and a function of an instruction corresponding to user voice input is executed according to an example embodiment.

FIG. 7A is a diagram illustrating an embodiment in which an operation corresponding to the user voice input is identified as a fifth operation and a function of an instruction corresponding to user voice input is executed according to an example embodiment.

Referring to FIG. 7A, the user may utter the ninth user voice input 710 of "XX! YY! Music!". The electronic apparatus 100 may receive the ninth user voice input 710, identify an operation corresponding to the ninth user voice input 710, and identify whether to execute a function for the instruction corresponding to the ninth user voice input 710.

For example, when the ninth user voice input 710 is input to the ASR model and the accuracy of the outputted text is high (e.g., 0.7), the second value may be set to a low value (e.g., 0.3). In addition, "XX" and "YY" in the text "XX" and "YY" corresponding to the ninth user voice input 710 may be a curse word or a negative word. In this example, the electronic apparatus 100 may set the first value to a value having a low value (e.g., −0.2) by identifying that a second type of word is included in the text corresponding to the ninth user voice input 710. The electronic apparatus 100 may identify that a value summing the first value and the second value as being present in the fifth range (e.g., greater than 0 and less than or equal to 0.2) and identify an operation corresponding to the ninth user voice input 710 as a fifth operation.

The electronic apparatus 100 may identify at least one instruction of which similarity with the text corresponding to the ninth user voice input 710 exceeds a threshold value, among the plurality of pre-stored instructions. According to the embodiment of FIG. 7A, the at least one instruction may include a first instruction for playing music by executing an A application; a second instruction for playing music by executing the B application; and a third instruction for playing music stored in the electronic apparatus 100 through the C application. In addition, the electronic apparatus 100 may identify an instruction for executing the functions of the first instruction, the second instruction, and the third instruction as the first instruction according to the embodiments described in FIGS. 1 and 2. For example, the first instruction may have the highest similarity with the text corresponding to the ninth user voice input 710.

The electronic apparatus 100 may execute a function corresponding to the first instruction. The electronic apparatus 100 may not provide a response corresponding to the ninth user voice input 710 according to the fifth operation. The electronic apparatus 100 may not provide text and voice responses corresponding to the ninth user voice input 710, and may play music while executing the A application according to the first instruction.

Figure 7B:
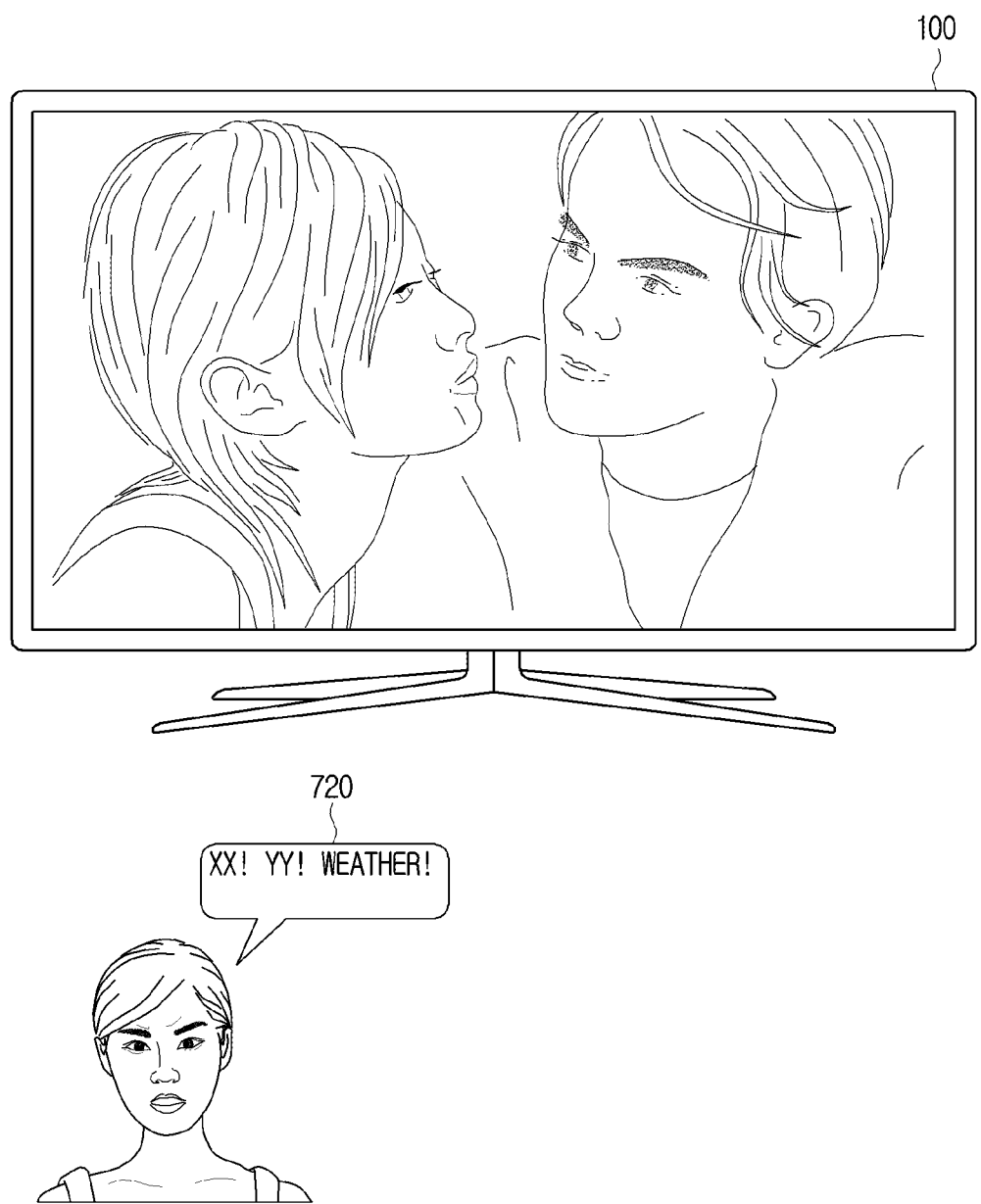
FIG. 7B is a diagram illustrating an embodiment in which an operation corresponding to the user voice input is identified as a fifth operation and a function of an instruction corresponding to user voice input is not executed according to an example embodiment.

FIG. 7B is a diagram illustrating an embodiment in which an operation corresponding to the user voice input is identified as a fifth operation and a function of an instruction corresponding to user voice input is not executed according to an example embodiment. Referring to FIG. 7B, a user may utter a tenth user voice input 720 of "XX! YY! Weather!". The electronic apparatus 100 may receive the tenth user voice input 720, identify an operation corresponding to the tenth user voice input 720, and identify whether to execute a function for the instruction corresponding to the tenth user voice input 720.

For an example, when accuracy of the text output by inputting the tenth user voice input 720 to the ASR model is high (e.g., 0.7), the second value may be set to a low value (e.g., 0.3). In addition, in the text (XX YY music) corresponding to the tenth user voice input 720, "XX" and "YY" may be a curse word or a negative word. In this example, the electronic apparatus 100 may identify that the second type of word is included in the text corresponding to the tenth user voice input 720 and may set the first value to a low value (e.g., −0.2). The electronic apparatus 100 may identify that the sum (e.g., 0.1) of the first value and the second value is within a fifth range (e.g., greater than 0 and less than or equal to 0.2), and may identify an operation corresponding to the tenth user voice input 720 as a fifth operation.

The electronic apparatus 100 may identify that there is no instruction of which similarity with the text corresponding to the tenth user voice input 720 exceeds a threshold (e.g., 0.7) among a plurality of pre-stored instructions. The electronic apparatus 100 may identify that the function corresponding to the tenth user voice input 720 is not executed.

The electronic apparatus 100 may not execute a function corresponding to the tenth user voice input 720 and may not provide a response corresponding to the tenth user voice input 720 according to a fifth operation. For example, referring to FIG. 7B, the electronic apparatus 100 may not execute a function corresponding to the tenth user voice input 720 even when receiving the tenth user voice input 720, and may not provide a response corresponding to the tenth user voice input 720.

Although the above-described drawings illustrate that the electronic apparatus 100 is a TV, the electronic apparatus 100 is not limited thereto. For example, the electronic apparatus 100 may be implemented as a user terminal device including a display. As an example, the electronic apparatus 100 may be implemented as an AI speaker that does not include a display.

Figure 8:
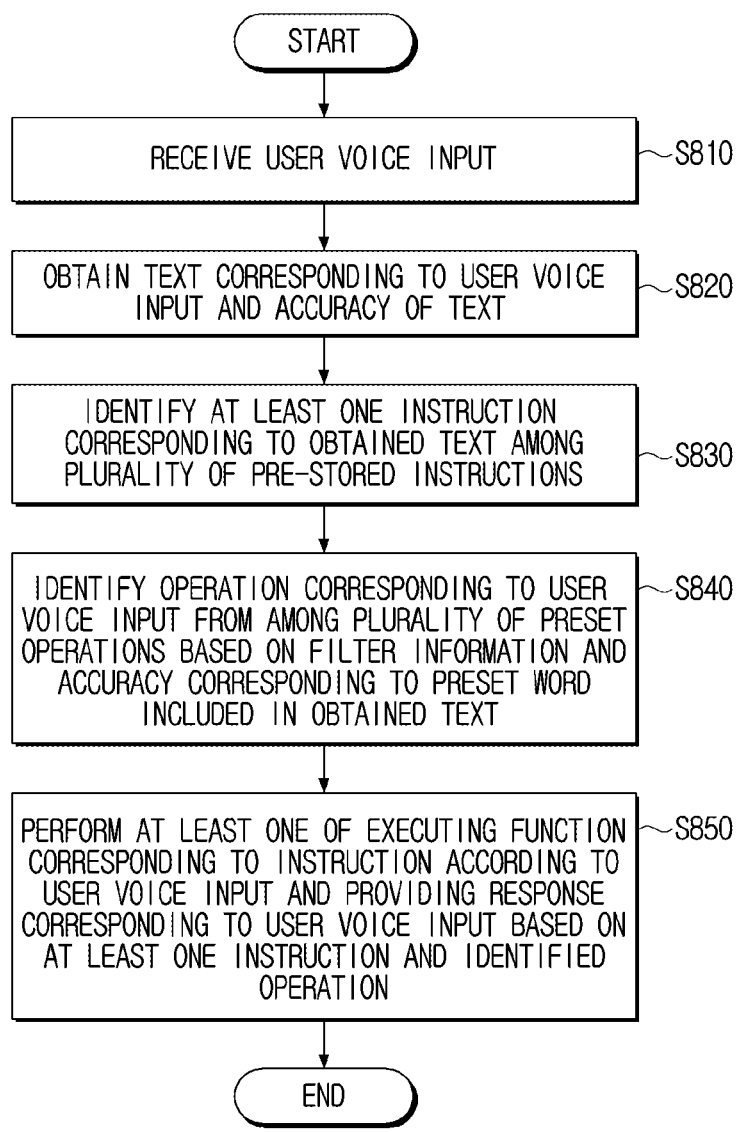
FIG. 8 is a flowchart illustrating an operation of an electronic apparatus according to an example embodiment.

FIG. 8 is a flowchart illustrating an operation of an electronic apparatus according to an example embodiment.

Referring to FIG. 8, the electronic apparatus 100 may receive a user voice input in operation S810. For example, the electronic apparatus 100 may receive a user voice input through a microphone included in the electronic apparatus 100. For example, the electronic apparatus 100 may receive a user voice through an external microphone (e.g., a microphone of a remote controller) outside the electronic apparatus 100. The user voice input may include a voice of a user to perform a specific function in the electronic apparatus 100.

The electronic apparatus 100 may obtain the text corresponding to the user's voice input and the accuracy of the text in operation S820. The electronic apparatus 100 may obtain a text corresponding to the user's voice input and accuracy information about the text by inputting the user's voice input into the ASR model. Here, the ASR model may be a model for converting a speech signal into text, and may be implemented as an artificial intelligence mode.

The electronic apparatus 100 may identify at least one instruction corresponding to the obtained text among a plurality of pre-stored instructions in operation S830. For example, a plurality of instructions for providing a function corresponding to a user's voice input may be stored in the memory 110 of the electronic apparatus 100. The electronic apparatus 100 may compare a plurality of instructions pre-stored in the memory 110 with text corresponding to a user voice input obtained through the ASR model, and may identify at least one instruction corresponding to the text corresponding to the user voice input among a plurality of instructions. For example, the electronic apparatus 100 may obtain a similarity between each of a plurality of instructions pre-stored in the memory 110 and a text corresponding to a user voice input obtained through an ASR model, and may identify at least one instruction among the plurality of instructions based on the obtained similarity.

In an embodiment, the electronic apparatus 100 may identify at least one instruction of which a similarity with text corresponding to a user voice input obtained through an ASR model among a plurality of instructions exceeds a threshold value (e.g., 0.7). As still another embodiment, if an instruction of which a similarity with text corresponding to the user's voice input obtained through the ASR model among the plurality of instructions exceeds a threshold value (e.g., 0.7) is not identified, the electronic apparatus 100 may identify the instruction of a preset number (e.g., three) having a high threshold value of similarity with the text corresponding to the user's voice input obtained through the ASR model among a plurality of instructions.

The electronic apparatus 100 may identify an operation corresponding to the user's voice input from among a plurality of preset operations based on filter information and accuracy corresponding to a preset word included in the obtained text in operation S840. Here, the preset operation may include a plurality of operation types for providing various responses corresponding to the user's voice input. For example, the preset operation may include a first operation that provides the most aggressive response, a second operation that provides an active response, a third operation that provides a basic response, a fourth operation that provides a simplified response, and a fifth operation that provides a minimized response.

The filter information may be information on whether a preset word is included in the text obtained through the ASR model. For example, when a preset first type of word is identified among words included in the obtained text, the electronic apparatus 100 may set the first value corresponding to the filter information to increase according to the first type of word. When a preset second type of word is identified from among the words included in the obtained text, the electronic apparatus 100 may set the first value corresponding to the filter information to be lowered according to the second type of word. The electronic apparatus 100 may set the second value corresponding to the accuracy to decrease (e.g., 0) as the accuracy value of the text obtained from the ASR model increases (e.g., 1), and as the accuracy value decreases (e.g., 0), the electronic apparatus 100 may set to increase the second value corresponding to the accuracy (e.g., 1).

The electronic apparatus 100 may perform at least one of executing a function corresponding to the instruction according to the user's voice input and providing a response corresponding to the user's voice input based on the at least one instruction and the identified operation in operation S850. For example, providing a response corresponding to the user's voice input may be provided based on an operation identified among the first to fifth operations. The function execution corresponding to the instruction according to the user's voice input may be provided based on whether to execute the function corresponding to the instruction.

Figure 9:
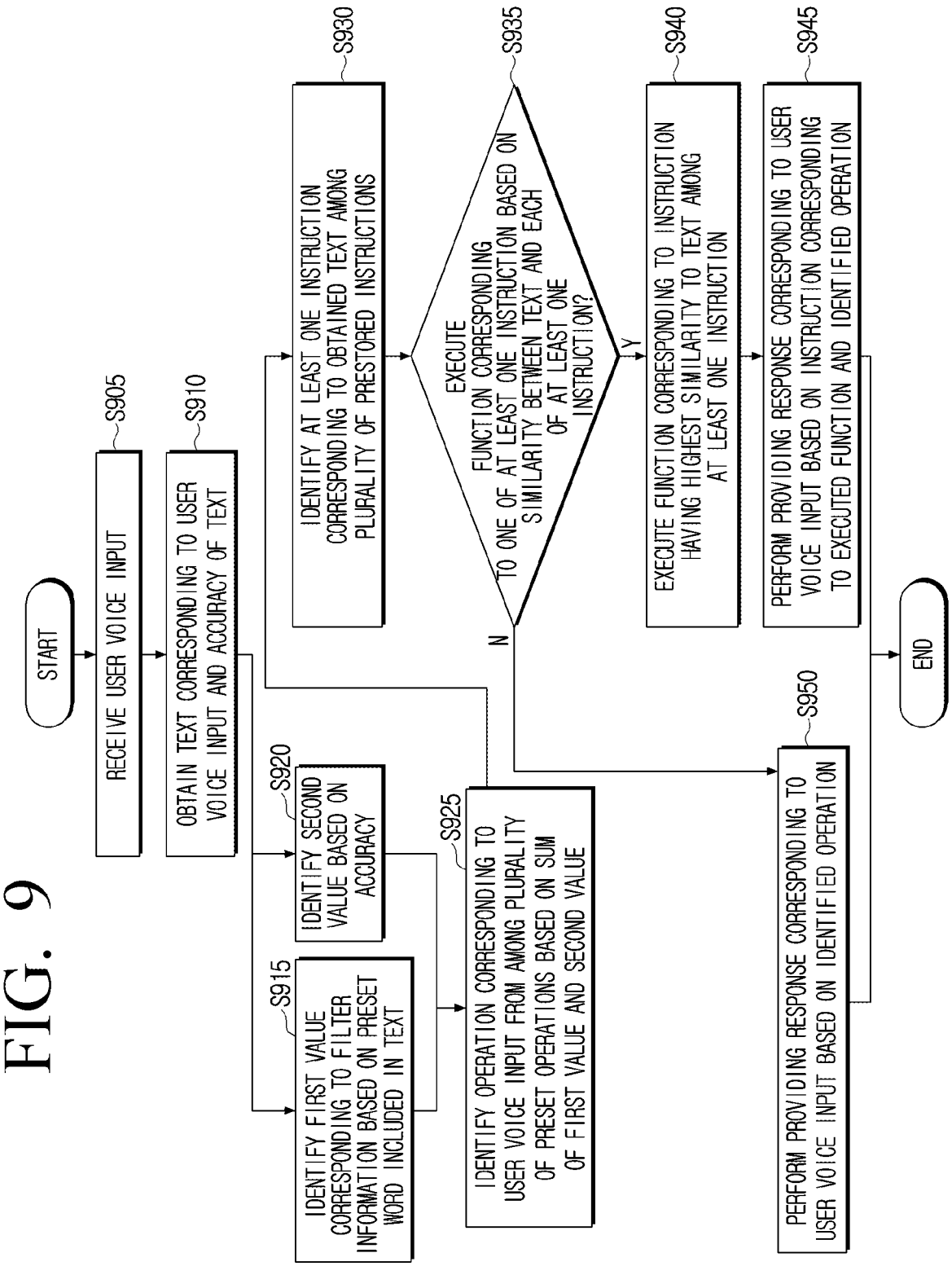
FIG. 9 is a flowchart illustrating an operation of an electronic apparatus according to an example embodiment.

FIG. 9 is a flowchart illustrating an operation of an electronic apparatus according to an example embodiment.

Referring to FIG. 9, the electronic apparatus 100 may receive a user voice input in operation S905. The electronic apparatus 100 may obtain text corresponding to the user's voice input and accuracy of the text in operation S910.

When the text corresponding to the user's voice input and the accuracy of the text are obtained, the electronic apparatus 100 may identify a first value corresponding to the filter information based on a preset word included in the text in operation S915. For example, when a preset first type of word is identified among words included in the obtained text, the electronic apparatus 100 may set the first value corresponding to the filter information to increase according to the first type of word. When a preset second type of word is identified from among the words included in the obtained text, the electronic apparatus 100 may set the first value corresponding to the filter information to be lowered according to the second type of word.

When the text corresponding to the user's voice input and the accuracy of the text are obtained, the electronic apparatus 100 may identify a second value based on the accuracy in operation S920. As an example, the electronic apparatus 100 may set the second value corresponding to the accuracy to decrease (e.g., 0) as the accuracy value of the text obtained from the ASR model increases (e.g., 1), and as the accuracy value decreases (e.g., 0), the second value corresponding to accuracy to increase (e.g., 1).

The electronic apparatus 100 may identify an operation corresponding to the user's voice input from among a plurality of preset operations based on the sum of the first value and the second value in operation S925. For example, the range of the summed values may be in the range of 0 to 1, and the range of the summed values may be lower than 0 or higher than 1 according to the first value and the second value. For example, when it is identified that the summed value is within the first range (greater than 0.8), the electronic apparatus 100 may identify an operation corresponding to the user's voice input as the first operation. When it is identified that the summed value is within the second range (more than 0.6 and less than or equal to 0.8), the electronic apparatus 100 may identify an operation corresponding to the user's voice input as the second operation. When it is identified that the summed value is within the third range (more than 0.4 and less than or equal to 0.6), the electronic apparatus 100 may identify the operation corresponding to the user's voice input as the third operation. When it is identified that the summed value is within the fourth range (more than 0.2 and less than or equal to 0.4), the electronic apparatus 100 may identify the operation corresponding to the user's voice input as the fourth operation. When it is identified that the summed value is within the fifth range (0.2 or less), the electronic apparatus 100 may identify the operation corresponding to the user's voice input as the fifth operation.

The electronic apparatus 100 may identify at least one instruction corresponding to the obtained text among a plurality of prestored instructions in operation S930.

The electronic apparatus 100 may determine whether to execute a function corresponding to one of the at least one instruction based on the similarity between the text and each of the at least one instruction in operation S935.

In an embodiment, when at least one instruction of which a similarity with text corresponding to a user voice input obtained through an ASR model among a plurality of instructions is identified to exceed a threshold value (e.g., 0.7), the electronic apparatus 100 may identify that a function corresponding to the instruction is executed. As a still another embodiment, if it is not identified that an instruction of which a similarity with text corresponding to the user's voice input obtained through the ASR model among the plurality of instructions exceeds a threshold value (e.g., 0.7), the electronic apparatus 100 may identify the instruction of a predetermined number (e.g., three) of a high threshold value of a similarity with the text corresponding to the obtained user voice input, and may identify not to execute a function corresponding to the instruction.

Meanwhile, in FIG. 9 and the above description, after operations S915, S920 and S925 are performed, it is illustrated that operations S930 and S935 are performed, but the disclosure is not limited thereto. That is, operations S915, S920, and S925 and operations S930 and S935 are independently performed, and the electronic apparatus 100 may perform operations S915, S920, and S925 after performing operations S930 and S935. Also, the electronic apparatus 100 may simultaneously perform operations S915, S920, and S925 and operations S930 and S935.

If it is determined that the function corresponding to one of the at least one instruction is executed in operation S935-Y, the electronic apparatus 100 may execute a function corresponding to the instruction having the highest similarity to text among the at least one instruction in operation S940. When there are two or more instructions having the highest similarity among at least one instruction, the electronic apparatus 100 may perform a function corresponding to an instruction having a large number of interactions required before performing a function corresponding to the instruction among instructions with the highest similarity.

The electronic apparatus 100 may provide a response corresponding to the user's voice input based on the instruction corresponding to the function executed according to operation S940 and the operation identified according to operation S925. The electronic apparatus 100 may perform a function corresponding to one of at least one instruction according to operation S940 and may provide response in operation S945 corresponding to the user voice input based on the operation (e.g., first operation to fifth operation) identified according to operation S925. "Based on" as used herein covers based at least on.

Based on identifying that a function corresponding to the instruction is not executed in operation S935-N, the electronic apparatus 100 may perform providing a response corresponding to the user voice input based on the identified operation in operation S950. The electronic apparatus 100 may provide a response corresponding to the user's voice input based on the operation identified according to operation S925 without executing a function corresponding to at least one instruction.

Figure 10:
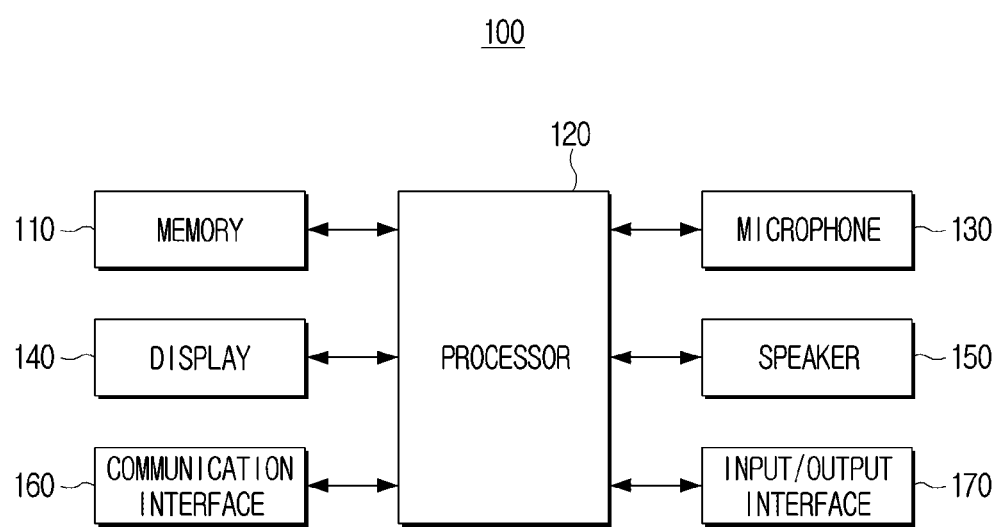
FIG. 10 is a block diagram illustrating a configuration of an electronic apparatus 100 according to an example embodiment.

FIG. 10 is a block diagram illustrating a configuration of an electronic apparatus 100 according to an example embodiment.

Referring to FIG. 10, the electronic apparatus 100 may include the memory 110, the processor 120, a microphone 130, a display 140, a speaker 150, a communication interface 160, and an input/output interface 170. Here, the configuration of the memory 110 and the processor 120 is the same as the configuration shown in FIG. 1, and overlapping descriptions are omitted.

The microphone 130 may receive an audio signal from the outside. Specifically, the microphone 130 may receive an audio signal including a user voice input. The user's voice input may include an instruction for controlling the electronic apparatus 100 through the voice recognition engine, and may further include a trigger voice for activating the voice recognition engine. When the electronic apparatus 100 receives an audio signal from the microphone 130, the microphone 130 may digitize the received analog audio signal and transmit the same to the processor 120.

The electronic apparatus 100 illustrated in FIG. 10 is disclosed as including the microphone 130, but is not limited thereto, and an external electronic apparatus may receive an audio signal, and the electronic apparatus 100 may receive an audio signal from an external electronic apparatus.

As an example, the external electronic apparatus may be implemented as a user terminal device capable of controlling the electronic apparatus 100, and the user terminal device may be, for example, a smart phone including a display. In this case, a specific application for controlling the electronic apparatus 100 may be installed in the user terminal device, and an audio signal may be transmitted from the user terminal device to the electronic apparatus 100 through the corresponding application.

For example, the external electronic apparatus may be implemented as a smart device including a microphone, and the smart device may be a device capable of receiving a user's voice input, such as an AI speaker. In this example, a specific application for controlling the electronic apparatus 100 may be installed in the smart device, and an audio signal may be transmitted from the user terminal device to the electronic apparatus 100 through the corresponding application.

When receiving an audio signal from an external electronic device, the external electronic device may digitize the input analog audio signal and transmit the signal to the electronic apparatus 100 through Bluetooth communication scheme, or the like.

The display 140 may display various information under the control of the processor 120. For example, the display 140 may display a response corresponding to the user's voice input according to an operation corresponding to the identified user's voice input. In addition, although the electronic apparatus 100 disclosed in FIG. 10 is disclosed as including the display 140, the disclosure is not limited thereto, and the electronic apparatus may be connected to an external display and may display a response corresponding to the user's voice input through an external display.

The display 140 may be implemented in various forms such as a liquid crystal display (LCD), a light emitting diode (LED), an organic light emitting diode (OLED) display, a liquid crystal on silicon (LCoS), digital light processing (DLP), or the like. In the display 140, a backlight unit, a driving circuit which may be implemented as an a-si TFT, low temperature poly silicon (LTPS) TFT, organic TFT (OTFT), or the like, may be included as well. The display 140 may be implemented as a touch screen coupled to a touch sensor, a flexible display, a rollable display. The display 140 may be implemented as a touch screen in combination with the touch sensor.

The speaker 150 (e.g., see FIG. 10) is a component for outputting various kinds of audio data received from the outside, as well as various kinds of notification sounds and voice messages. The electronic apparatus 100 may include an audio output device such as the speaker 150, and may include an output device such as an audio output terminal. In particular, the speaker 150 may output a response voice corresponding to the user voice input according to an operation corresponding to the identified user voice input.

The communication interface 160 may communicate with an external device via wireless communication or wired communication. For example, the wireless communication, for example, may include cellular communication using any one of the following, for example, long-term evolution (LTE), LTE advanced (LTE-A), a code division multiple access (CDMA), a wideband CDMA (WCDMA), and a universal mobile telecommunications system (UMTS), a wireless broadband (WiBro), or a global system for mobile communications (GSM), and the like. According to an embodiment, the wireless communication may include, for example, any one or any combination of wireless fidelity (Wi-Fi), Bluetooth, Bluetooth low energy (BLE), Zigbee, near field communication (NFC), magnetic secure transmission, radio frequency (RF), or body area network (BAN). Wired communication may include, for example, a universal serial bus (USB), a high definition multimedia interface (HDMI), a recommended standard 232 (RS-232), a power line communication, or a plain old telephone service (POTS). The network over which the wireless or wired communication is performed may include any one or any combination of a telecommunications network, for example, a computer network (for example, local area network (LAN) or wide area network (WAN)), the Internet, or a telephone network.

As an example, the electronic apparatus 100 may perform a communication connection, directly or indirectly, with an external user terminal device through the communication interface 160. The electronic apparatus 100 may be controlled through an application, or the like, installed on the user terminal device. When the user terminal device receives a user voice input through an application installed on the user terminal device, the electronic apparatus 100 may receive the user voice input from the user terminal device.

As an example, the electronic apparatus 100 may communicate with an external smart device through the communication interface 160. The smart device may receive a user voice input, such as an AI speaker, and may be various devices in which an application capable of controlling the electronic apparatus 100 may be installed.

For example, when the plurality of modules 1000 to 4000 of FIG. 2 are implemented in an external server, the electronic apparatus 100 may communicate with the external server through the communication interface 160 comprising interface circuitry.

The input and output interface 170 may input and output at least one of an audio signal and a video signal. The input and output interface 170 may be a high-definition multimedia interface (HDMI), but this is merely an example and the input and output interface 170 may be one interface from among mobile high-definition link (MHL), universal serial bus (USB), display port (DP), Thunderbolt, video graphics array (VGA) port, RGB port, d-subminiature (D-SUB), digital visual interface (DVI), and the like. According to an embodiment, the input and/or output interface 170 may include a port for inputting and outputting only an audio signal and a port for inputting and outputting only a video signal, or may be implemented as one port that inputs and outputs both the audio signal and the video signal.

The disclosure includes various embodiments, some of which are illustrated in the drawings and described in detail in the detailed description. However, this disclosure is not intended to limit the embodiments described herein but includes various modifications, equivalents, and/or alternatives. In the context of the description of the drawings, like reference numerals may be used for similar components.

In describing the disclosure, a detailed description of known functions or configurations incorporated herein will be omitted as it may make the subject matter of the disclosure unclear.

In addition, the embodiments described below may be modified in various different forms, and the scope of the technical concept of the disclosure is not limited to the following embodiments. Rather, these embodiments are provided so that this disclosure will be thorough and complete, and will fully convey the scope of the disclosure to those skilled in the art.

The terms used in this disclosure are used merely to describe a particular embodiment, and are not intended to limit the scope of the claims. The expression of a singular includes a plurality of representations, unless the context clearly indicates otherwise.

In this document, the expressions "have," "may have," "including," or "may include" may be used to denote the presence of a feature (e.g., a component, such as a numerical value, a function, an operation, a part, or the like), and does not exclude the presence of additional features.

The expressions "A or B," "at least one of A and/or B," or "one or more of A and/or B," and the like include all possible combinations of the listed items. For example, "A or B," "at least one of A and B," or "at least one of A or B" includes (1) at least one A, (2) at least one B, (3) at least one A and at least one B all together.

In addition, expressions "first", "second", or the like, used in the disclosure may indicate various components regardless of a sequence and/or importance of the components, will be used only in order to distinguish one component from the other components, and do not limit the corresponding components.

It is to be understood that an element (e.g., a first element) is "operatively or communicatively coupled with/to" another element (e.g., a second element) is that any such element may be directly connected to the other element or may be connected via another element(s) (e.g., via at least a third element).

On the other hand, when an element (e.g., a first element) is "directly connected" or "directly accessed" to another element (e.g., a second element), it may be understood that there is no other element (e.g., a third element) between the other elements.

Herein, the expression "configured to" may be used interchangeably with, for example, "suitable for," "having the capacity to," "designed to," "adapted to," "made to," or "capable of." The expression "configured to" does not necessarily mean "specifically designed to" in a hardware sense.

Instead, under some circumstances, "a device configured to" may indicate that such a device can perform an action along with another device or part. For example, the expression "a processor configured to perform A, B, and C" may indicate an exclusive processor (e.g., an embedded processor) to perform the corresponding action, or a generic-purpose processor (e.g., a central processor (CPU) or application processor (AP)) that can perform the corresponding actions by executing one or more software programs stored in the memory device.

The terms such as "module," "unit," "part", and so on are used to refer to an element that performs at least one function or operation, and such element may be implemented as hardware or software, or a combination of hardware and software. Further, except for when each of a plurality of "modules", "units", "parts", and the like needs to be realized in an individual hardware, the components may be integrated in at least one module or chip and be realized in at least one processor. Each "module" herein may comprise circuitry, such as processing circuitry.

The various elements and regions in the drawings are schematically drawn. Accordingly, the technical spirit of the disclosure is not limited by the relative size or spacing depicted in the accompanying drawings.

The various embodiments described above may be implemented in software, hardware, or the combination of software and hardware. By hardware implementation, the embodiments of the disclosure may be implemented using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or electric units for performing other functions. In some cases, embodiments described herein may be implemented by the processor. According to a software implementation, embodiments, such as the procedures and functions described herein, may be implemented with separate software modules. Each of the above-described software modules may perform one or more of the functions and operations described herein.

A method according to various embodiments described above may be stored in a non-transitory readable medium. Such a non-transitory computer-readable medium may be loaded and used in a variety of devices.

A non-transitory computer-readable medium refers to a medium that stores data semi-permanently, rather than a medium that stores data for a short moment, such as a register, cache, memory, etc., and refers to a medium readable by a device. Specifically, the programs for performing the various methods described above may be stored and provided in a non-transitory readable medium, such as a compact disc (CD), a digital video disc (DVD), a hard disk, a Blu-ray disc, a universal serial bus (USB), a memory card, a read-only memory (ROM), etc.

Each embodiment herein may be used in combination with any other embodiment(s) described herein.

According to an embodiment, the method according to various embodiments disclosed herein may be provided in a computer program product. A computer program product may be exchanged between a seller and a purchaser as a commodity. A computer program product may be distributed in the form of a machine-readable storage medium (e.g., compact disc read only memory (CD-ROM)) or distributed online through an application store (e.g. PlayStore™) directly between two user devices (e.g., smartphones). In the case of on-line distribution, at least a portion of the computer program product may be stored temporarily or at least temporarily in a storage medium such as a manufacturer's server, a server of an application store, or a memory of a relay server.

While various example embodiments of the disclosure have been illustrated and described herein, it will be understood that the various example embodiments are intended to be illustrative, not limiting. One of ordinary skill in the art will understand that various changes in form and details may be made without departing from the true spirit and full scope of the disclosure as set forth, for example, in the appended claims and their equivalents. It will also be understood that each embodiment herein may be used in combination with any other embodiment(s) described herein.

What is claimed is:

1. A control method of an electronic apparatus, the method comprising:
   receiving a user voice input;
   obtaining a text corresponding to and/or based on at least the user voice input;
   identifying at least one instruction corresponding to the obtained text among a plurality of prestored instructions;
   identifying an operation type corresponding to the user voice input among a plurality of preset operation types based on filter information and accuracy of the text; and
   performing at least one of executing a function corresponding to an instruction based on the user voice input and providing a response corresponding to the user voice input based on the at least one instruction and the identified operation type,
   wherein the filter information is variably identified based on a type of word included in the obtained text.

2. The method of claim 1, wherein the identifying the operation type comprises:
   based on a predetermined first type word being identified among the words included in the obtained text, increasing a first value corresponding to the filter information based on the word of the first type, and based on a preset second type word being identified among the words included in the obtained text, decreasing a first value corresponding to the filter information based on the second type of word;
   based on the value of accuracy being higher, decreasing a second value corresponding to the accuracy, and based on the value of accuracy being lower, increasing a second value corresponding to the accuracy; and
   identifying an operation type corresponding to the user voice input among a plurality of preset operation types based on a value in which the first value and the second value are summed.

3. The method of claim 1, wherein the performing comprises, based on identifying that a function corresponding to an instruction is executed based on similarity between the text and the at least one instruction, performing a function corresponding to an instruction having a highest similarity with the text among the at least one instruction; and
   based on a function corresponding to the instruction having the highest similarity with the text being executed, performing provision of a response corresponding to the user voice input based on the instruction corresponding to the executed function and the identified operation.

4. The method of claim 3, comprising:
   based on identifying that a function corresponding to the instruction is not executed, performing provision of a response corresponding to the user voice input based on the identified operation.

5. The method of claim 2, wherein the identifying the operation type comprises, based on identifying that the summed value is present within a first range, identifying an operation type corresponding to the user voice input as a first operation type,
   wherein the performing comprises, based on identifying that the operation type corresponding to the user voice input is a first operation type, providing a different response depending on whether to execute a function corresponding to the instruction according to the user voice input.

6. The method of claim 5, wherein the providing the response further comprises:
   based on a function corresponding to the instruction according to the user voice input being executed, providing a list corresponding to a remaining instruction except for an instruction corresponding to the executed function among the at least one instruction; and
   based on a function corresponding to the instruction according to the user voice input being not executed, providing a list corresponding to the at least one instruction.

7. The method of claim 2, wherein the identifying the operation type comprises:
   based on identifying that the summed value is within the second range, identifying an operation type corresponding to the user voice input as a second operation type,
   wherein the performing comprises, based on identifying that an operation type corresponding to the user voice input is a second operation type, providing a different response depending on whether to execute a function corresponding to the instruction according to the user voice input.

8. The method of claim 7, comprising:
based on a function corresponding to the instruction according to the user voice input being executed, providing an associated instruction list providable after the executed function is executed; and
based on a function corresponding to the instruction according to the user voice input being not executed, providing a list corresponding to the at least one instruction.

9. The method of claim 2, wherein the identifying the operation type comprises, based on identifying that the summed value is within a third range, identifying the operation type corresponding to the user voice input as a third operation type,
wherein the performing comprises, based on identifying that an operation type corresponding to the user voice input is a third operation type and a function corresponding to the instruction according to the user voice input is executed, providing a text and a voice response corresponding to the executed function; and
based on identifying that an operation type corresponding to the user voice input is a third operation type and a function corresponding to the instruction according to the user voice input is not executed, providing a text and a voice response indicating that the function is not executed.

10. The method of claim 2, wherein the identifying the operation type comprises, based on identifying that the summed value is within a fourth range, identifying an operation type corresponding to the user voice as a fourth operation type,
wherein the performing comprises:
based on identifying that the operation type corresponding to the user voice input is a fourth operation type and a function corresponding to an instruction according to the user voice input is executed, providing a text corresponding to the executed function; and
based on identifying that the operation type corresponding to the user voice input is a fourth operation type and a function corresponding to an instruction according to the user voice input is not executed, providing a text indicating that the function is not executed.

11. The method of claim 2, wherein the identifying the operation type comprises, based on identifying that the summed value is within a fifth range, identifying an operation type corresponding to the user voice input as a fifth operation type, and
based on identifying that the operation type corresponding to the user voice input is a fifth operation type, not providing a response corresponding to the user voice input.

12. An electronic apparatus comprising:
a memory comprising at least one instruction, and
at least one processor comprising processing circuitry and connected to the memory and configured to control the electronic apparatus,
wherein the at least one processor, individually and/or collectively, is configured to:
receive a user voice input,
obtain a text corresponding to the user voice input and accuracy of the text,
identify at least one instruction corresponding to the obtained text among a plurality of prestored instructions,
identify an operation type corresponding to the user voice input among a plurality of preset operation types based on filter information and the accuracy, and
perform at least one of executing a function corresponding to an instruction according to the user voice input and providing a response corresponding to the user voice input, based on the at least one instruction and the identified operation type,
wherein the filter information is variably identified based on a type of word included in the obtained text.

13. The electronic apparatus of claim 12, wherein the at least one processor is further configured to:
based on a predetermined first type word being identified among the words included in the obtained text, increase a first value corresponding to the filter information according to the word of the first type, and based on a preset second type word being identified among the words included in the obtained text, decrease a first value corresponding to the filter information according to the second type of word,
based on the value of accuracy being higher, decrease a second value corresponding to the accuracy, and based on the value of accuracy being lower, increase a second value corresponding to the accuracy, and
identify an operation type corresponding to the user voice input among a plurality of preset operation types based on a value in which the first value and the second value are summed.

14. The electronic apparatus of claim 12, wherein the at least one processor is further configured to:
based on identifying that a function corresponding to an instruction is executed based on similarity between the text and the at least one instruction, perform a function corresponding to an instruction having a highest similarity with the text among the at least one instruction, and
based on a function corresponding to the instruction having the highest similarity with the text being executed, perform provision of a response corresponding to the user voice input based on the instruction corresponding to the executed function and the identified operation type.

15. The electronic apparatus of claim 14, wherein the at least one processor is further configured to, based on identifying that a function corresponding to the instruction is not executed, perform provision of a response corresponding to the user voice input based on the identified operation type.

16. The electronic apparatus of claim 13, wherein the at least one processor is further configured to:
based on identifying that the summed value is present within a first range, identify an operation type corresponding to the user voice input as a first operation type,
based on identifying that the operation type corresponding to the user voice input is a first operation type, provide a different response depending on whether to execute a function corresponding to the instruction according to the user voice input.

17. The electronic apparatus of claim 16, wherein the at least one processor is further configured to:
based on a function corresponding to the instruction according to the user voice input being executed, provide a list corresponding to a remaining instruction except for an instruction corresponding to the executed function among the at least one instruction; and
based on a function corresponding to the instruction according to the user voice input being not executed, provide a list corresponding to the at least one instruction.

18. The electronic apparatus of claim 13, wherein the at least one processor is further configured to:
- based on identifying that the summed value is within the second range, identify an operation type corresponding to the user voice input as a second operation type,
- based on identifying that an operation type corresponding to the user voice input is a second operation type, provide a different response depending on whether to execute a function corresponding to the instruction according to the user voice input.

19. The electronic apparatus of claim 18, wherein the at least one processor is further configured to:
- based on a function corresponding to the instruction according to the user voice input being executed, provide an associated instruction list providable after the executed function is executed; and
- based on a function corresponding to the instruction according to the user voice input being not executed, provide a list corresponding to the at least one instruction.

20. The electronic apparatus of claim 13, wherein the at least one processor is further configured to:
- based on identifying that the summed value is within a third range, identify the operation type corresponding to the user voice input as a third operation type,
- based on identifying that an operation type corresponding to the user voice input is a third operation type and a function corresponding to the instruction according to the user voice input is executed, provide a text and a voice response corresponding to the executed function; and
- based on identifying that an operation type corresponding to the user voice input is a third operation type and a function corresponding to the instruction according to the user voice input is not executed, provide a text and a voice response indicating that the function is not executed.

* * * * *